United States Patent
Tateuchi et al.

(10) Patent No.: US 8,519,912 B2
(45) Date of Patent: Aug. 27, 2013

(54) LIQUID-CRYSTAL DISPLAY APPARATUS

(75) Inventors: Mitsuru Tateuchi, Kanagawa (JP);
Tsutomu Harada, Kanagawa (JP);
Daisuke Takama, Kanagawa (JP);
Kazunori Yamaguchi, Kanagawa (JP);
Ryoichi Tsuzaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1015 days.

(21) Appl. No.: 12/270,324

(22) Filed: Nov. 13, 2008

(65) Prior Publication Data
US 2009/0135318 A1    May 28, 2009

(30) Foreign Application Priority Data
Nov. 28, 2007  (JP) ................................. 2007-306695

(51) Int. Cl.
*G06F 3/042*    (2006.01)
*G09G 5/00*    (2006.01)

(52) U.S. Cl.
USPC ............... 345/76; 345/173; 345/175; 349/62; 349/106; 349/110

(58) Field of Classification Search
USPC ..................... 345/173, 76, 175; 349/62, 106, 349/110
See application file for complete search history.

(56) References Cited

U.S. PATENT DOCUMENTS

| 7,812,906 | B2 * | 10/2010 | Eguchi | 349/116 |
| 7,924,272 | B2 * | 4/2011 | Boer et al. | 345/175 |
| 2004/0051659 | A1 * | 3/2004 | Garrison | 342/70 |
| 2006/0192766 | A1 * | 8/2006 | Nakamura et al. | 345/173 |
| 2006/0244693 | A1 * | 11/2006 | Yamaguchi et al. | 345/76 |

FOREIGN PATENT DOCUMENTS

| JP | 2005-275644 | 11/2005 |
| JP | 2006-301864 | 11/2006 |

OTHER PUBLICATIONS

A Touch Panel Function Integrated LCD Using LTPS Technology N. Tada, H. Hayashi, M. Yoshida, M Ishikawa, T. Nakamura, T. Motai and T. Nishibe Research and Development Center, Toshiba Matsushita Display Technology Co., Ltd. 1-9-2 Hatara-cho, Fukaya-shi, Saitama 366-0032, Japan.
Japanese Office Action (JP2007-306695) dated Dec. 1, 2009.

* cited by examiner

*Primary Examiner* — Quan-Zhen Wang
*Assistant Examiner* — Michael J Eurice
(74) *Attorney, Agent, or Firm* — K&L Gates LLP

(57) ABSTRACT

A liquid-crystal display apparatus is provided. The liquid-crystal display apparatus including: a light source for generating visible-domain light and invisible-domain light; a plurality of liquid-crystal devices laid out in a display face region of the liquid-crystal display apparatus for modulating visible-domain light and transmitting invisible domain light generated by the light source; a plurality of light receiving devices laid out in the display face region as devices each used for receiving invisible-domain light; a display driving section configured to drive the liquid-crystal devices so as to radiate visible-domain light from the display face as display light; a light-reception driving section configured to drive the light receiving devices to detect invisible-domain light radiated from the display face and reflected by a detection-subject object as detected light; and a detection section configured to detect the detection-subject object on the basis of a received-light signal obtained from the light receiving devices.

20 Claims, 13 Drawing Sheets

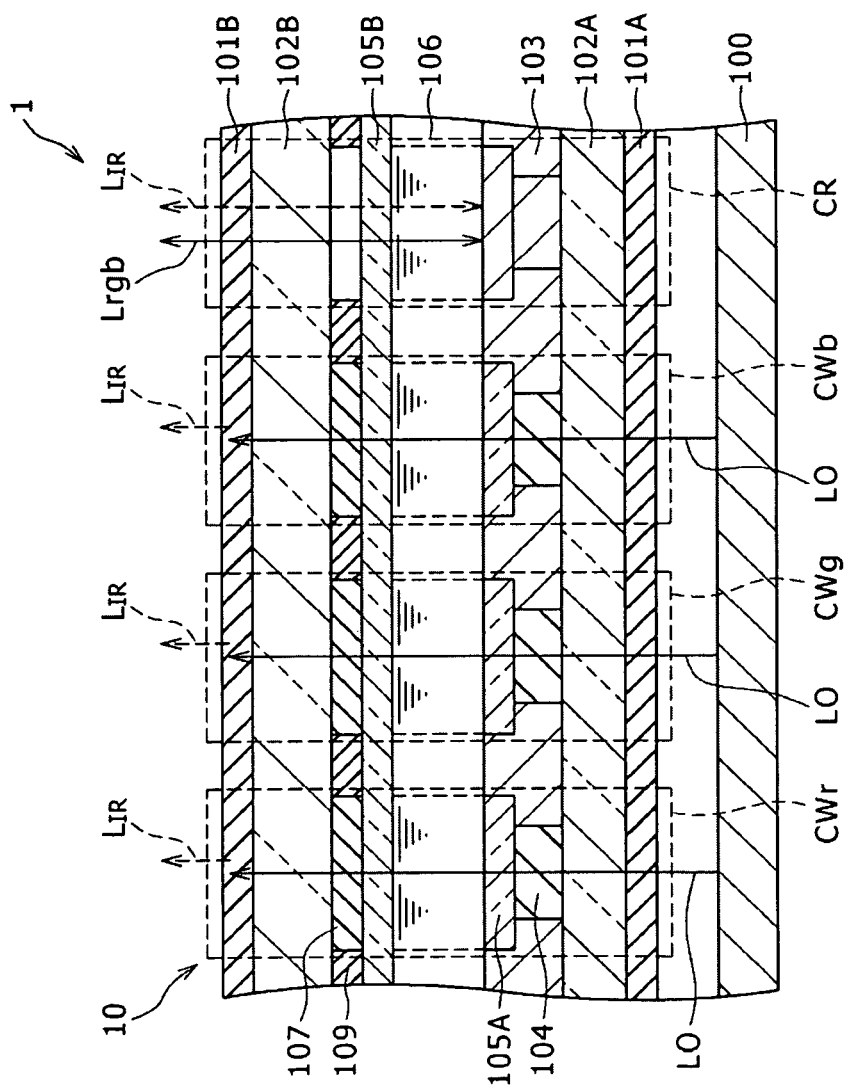

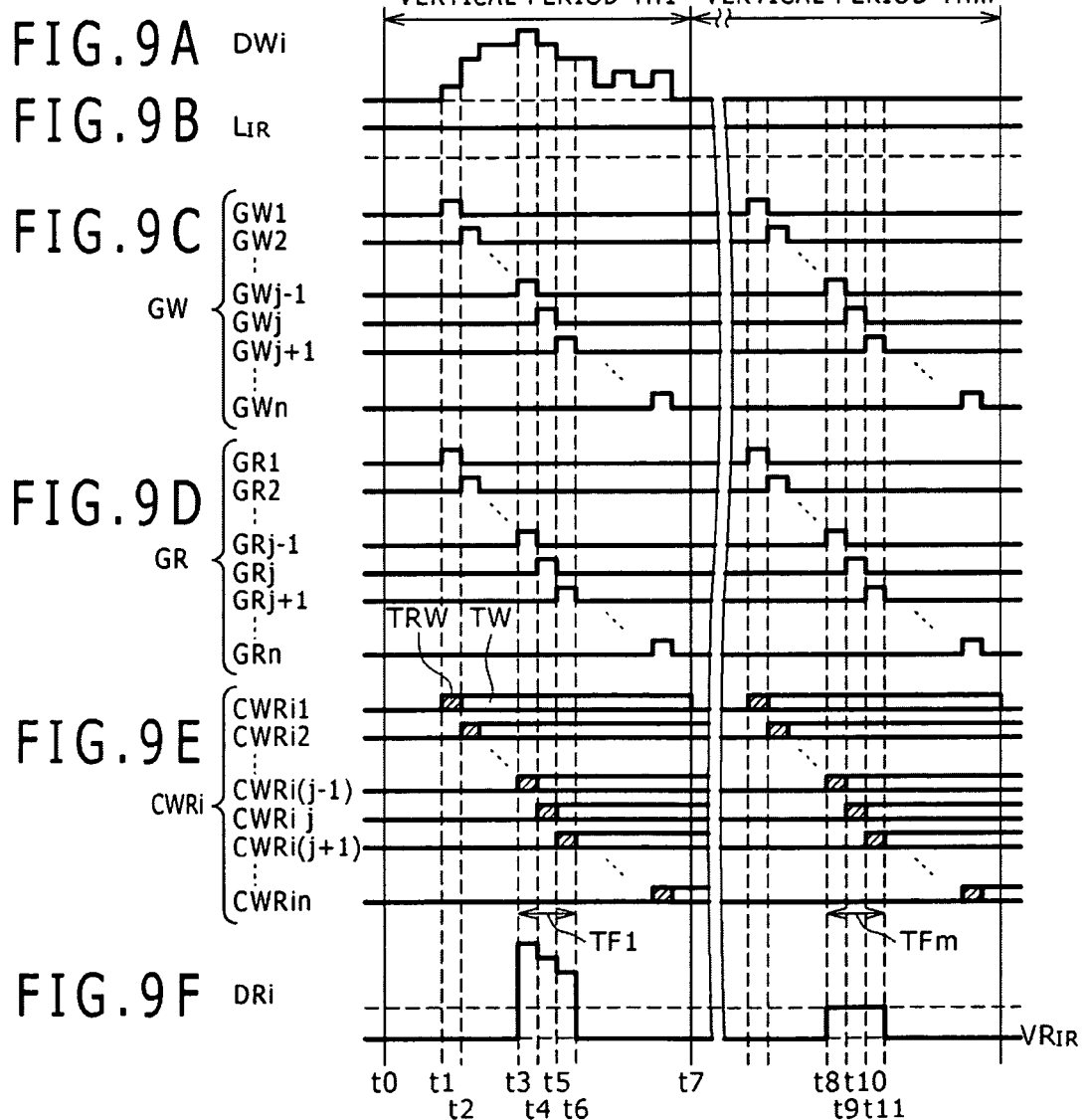

LIQUID-CRYSTAL DISPLAY APPARATUS

CROSS REFERENCE TO RELATED APPLICATIONS

The present application claims priority to Japanese Patent Application JP 2007-306695 filed in the Japan Patent Office on Nov. 28, 2007, the entire contents of which being incorporated herein by reference.

BACKGROUND

The present application relates to a liquid-crystal display apparatus having a function to determine typically the position of an object coming into contact with or approaching the display face of the apparatus.

In the past, there have been introduced technologies each used for determining typically the position of an object coming into contact with or approaching the display face of a display apparatus. The introduced technologies include a representative technology generally becoming popular in a wide range of applications as a technology for implementing the touch panel of a display apparatus.

There are a variety of types of the touch panel. A touch panel of a type generally becoming popular is a panel for detecting an electrostatic capacitance. In the case of such a touch panel, when the panel is touched by an object such as a finger, a change of electric charge on the surface of the panel is detected and the touched position on the surface is thus determined. Therefore, by making use of such a panel, the user is allowed to carry out an operation on the panel intuitively.

In addition, in recent years, there are proposed a variety of technologies for determining typically the position of an object without providing such a touch panel on a display face.

For example, "A Touch Panel Function Integrated LCD Using LTPS Technology" written by six authors including N. Tada, IDW '04 Proceedings of the 11$^{th}$ International Display Workshops, International Display Workshops, pp. 349-350 (hereinafter referred to as Non-Patent Document) discloses a technology for grabbing typically the image of an object by providing an optical sensor in every pixel on a liquid-crystal display apparatus manufactured by making use of the low-temperature poly-silicon.

SUMMARY

By making use of the liquid-crystal display apparatus disclosed in Non-Patent Document 1, typically, the position of an object serving as a subject of detection can be determined on the basis of the grabbed image of the object. Thus, by making use of such a liquid-crystal display apparatus, typically, the position of an object can be determined in a simple configuration obviating a need for a component such as a touch panel to be provided specially.

In an operation to grab typically the image of an object in such a liquid-crystal display apparatus, however, the luminance of received light is affected by the brightness of a surrounding environment. Thus, in a dark surrounding environment, it is undesirably difficult to determine typically the position of an object on the basis of the grabbed image of the object. The reference describes that, as shown in FIG. 5 of the reference, when an object such as a finger comes into contact with or approaches a display face for example, the object reflects display light and, by making use of the reflected display light, the position of the object can be determined even if the surrounding environment is dark.

If display light reflected by an object coming into contact with or approaching a display face is used, however, the luminance of the reflected display light becomes a problem. To put it concretely, the luminance of received light is affected by the luminance of the reflected display light and the luminance of the reflected display light varies in accordance with image data. As a result, when the display face is in the so-called black display state, it is still undesirably difficult to determine typically the position of an object on the basis of a grabbed image of the object.

In order to solve the problem, it is conceivable to detect an object by making use of invisible light such as infrared light. This is because, by radiating such invisible light from the display face of a liquid-crystal display apparatus along with display light (that is, visible light), it is conceivable to reliably detect an object coming into contact with or approaching the display face even if the display face is in the so-called black display state.

When an object is detected by making use of invisible light such as infrared light, however, in accordance with the configuration of the liquid-crystal display apparatus, the efficiency of utilization of invisible light may conceivably deteriorate, excessively increasing the power consumption of the liquid-crystal display apparatus as a whole.

When detecting an object coming into contact with or approaching the display face of a liquid-crystal display apparatus by adoption of the existing technology, however, it is inevitably difficult to reliably detect the object by making use of a simple configuration independently of the apparatus utilization state such as the luminance of the display light without excessively increasing the power consumption of the liquid-crystal display apparatus. Thus, there is still room for improvement in such an existing technology.

Addressing the problems described above, inventors of the present application have innovated a liquid-crystal display apparatus capable of reliably detecting the object by making use of a simple configuration independently of the apparatus utilization state without excessively increasing the power consumption of the liquid-crystal display apparatus.

A liquid-crystal display apparatus according to an embodiment of the present application employs: a light source for generating visible-domain light and invisible-domain light; a plurality of liquid-crystal devices laid out in a display face region of the liquid-crystal display apparatus for modulating visible-domain light generated by the light source on the basis of image data and transmitting invisible domain light generated by the light source; a plurality of light receiving devices laid out in the display face region as devices each used for receiving invisible-domain light; a display driving section configured to drive the liquid-crystal devices on the basis of the image data so as to radiate visible-domain light from the display face as display light; a light-reception driving section configured to drive the light receiving devices to detect invisible-domain light radiated from the display face and reflected by a detection-subject object reflecting the invisible-domain light generated by the light source and radiated from the display face, as detected light; and a detection section configured to detect the detection-subject object on the basis of a received-light signal obtained from the light receiving devices.

The light detected by the light receiving devices as light in the invisible domain is light reflected by the detection-subject object as light having wavelengths outside the visible domain. Normally, the wavelengths outside the visible domain are in the range 400 to 700 nm. The display light radiated by the liquid-crystal devices is light obtained as a result of a process to modulate visible-domain light generated by the light source on the basis of image data. The detection-subject object is an object which comes into contact with or approaches the display face. Examples of the detection-subject object are a finger or a pointer.

In the liquid-crystal display apparatus according to an embodiment of the present application, the light source generates visible-domain light which is light in the visible domain and invisible-domain light which is light in the invisible domain. The display driving section carries out a display driving operation to drive the liquid-crystal devices laid out on the display face so as to radiate light in the visible domain from the display face as display light by modulating the visible-domain light generated by the light source on the basis of image data. On the other hand, the liquid-crystal devices laid out on the display face transmit invisible-domain light also generated by the light source in order to radiate the light in the invisible domain. If a detection-subject object is coming into contact with or approaching the display face at that time, the object reflects the invisible-domain light generated by the light source and radiated from the display face and the light receiving devices detect the invisible-domain light reflected by the object as detected light in a light receiving operation driven by the light-reception driving section. Then, the detection section detects the detection-subject object on the basis of a received-light signal obtained from the light receiving devices. Since the detected light is light in the invisible domain, the object serving as the subject of detection can be detected by recognizing the detected light without being affected by the apparatus utilization state. An example of the apparatus utilization state is the display light which has a luminance varying in accordance with image data. In addition, the detected light can be recognized in a simple configuration obviating a need for a component such as a touch panel to be provided specially. On top of that, since the liquid-crystal devices laid out on the display face transmit invisible-domain light also generated by the light source in order to radiate the light in the invisible domain, the efficiency of utilization of the invisible-domain light generated by the light source is good in comparison with the case of a configuration in which the invisible-domain light generated by the light source is radiated only for example from a partial area of the display face. Such a partial area of the display face is referred to as a radiation area dedicated to light in the invisible domain.

In the liquid-crystal display apparatus according to an embodiment of the present application, the liquid-crystal devices are arranged on the display face to form a matrix. By the same token, the light receiving devices are also arranged on the display face to form the matrix. In addition, the display driving section drives the liquid-crystal devices to carry out a line-sequential display operation, which is defined as a display operation carried out sequentially line after line by taking each line as a unit of the operation. On the other hand, the light-reception driving section drives the light receiving devices to carry out a line-sequential light receiving operation, which is defined as a light receiving operation sequentially line after line by taking each line as a unit of the operation.

The matrix thus includes the liquid-crystal devices and the light receiving devices each forming a pair in conjunction with one of the liquid-crystal devices as a device-pair element of the matrix. In the matrix, the liquid-crystal devices are arranged in the horizontal line and vertical line directions of the display face. By the same token, the light receiving devices are also arranged in the horizontal line and vertical line directions of the display face. Each of the device-pair elements of the matrix is referred to as a pixel. The line-sequential display operation is a display operation carried out by the liquid-crystal device of each pixel on a horizontal line in a sequential manner line after line. On the other hand, the line-sequential light receiving operation is a light receiving operation carried out by the light receiving device of each pixel on a horizontal line in a sequential manner line after line. The line-sequential display operation and the line-sequential light receiving operation are carried out on the entire display face of the liquid-crystal display apparatus so that image data of one screen can be displayed and detected light can be received by all pixels on the screen.

In accordance with the liquid-crystal display apparatus provided by the present embodiment, the light-reception driving section drives the light receiving devices in a light receiving operation to detect invisible-domain light radiated from the display face and reflected by a detection-subject object reflecting the invisible-domain light generated by the light source and radiated from the display face, as detected light and the detection section detects the detection-subject object on the basis of a received-light signal obtained from the light receiving devices as a signal representing the detected light. Thus, the object serving as the subject of detection can be detected with a high degree of reliability by recognizing the detected light without being affected by the apparatus utilization state. In addition, the detected light can be recognized in a simple configuration obviating a need for a component such as a touch panel to be provided specially. On top of that, since the liquid-crystal devices laid out on the display face transmit invisible-domain light also generated by the light source in order to radiate the light in the invisible domain from the display face, the efficiency of utilization of the invisible-domain light generated by the light source can be improved. As a result, the liquid-crystal display apparatus according to an embodiment of the present application is capable of reliably detecting the object serving as the subject of detection by making use of a simple configuration independently of the apparatus utilization state without excessively increasing the power consumption of the liquid-crystal display apparatus.

Additional features and advantages are described herein, and will be apparent from the following Detailed Description and the figures.

BRIEF DESCRIPTION OF THE FIGURES

FIG. 7 is a cross-sectional diagram showing a cross section of the display section put in a condition corresponding to a black display state;

FIGS. 9A to 9F are a plurality of timing charts showing timings of a process carried out by the liquid-crystal display apparatus shown in the diagram of FIG. 1 as a process to determine the position of a detection-subject object;

DETAILED DESCRIPTION

A preferred embodiment is explained below in detail by referring to diagrams. In the following description, the preferred embodiment is referred to simply as an embodiment. It is to be noted that, in the embodiment described below, the invisible domain of light is a domain of invisible light wavelengths greater than the domain of visible light. Thus, the invisible domain of light includes the domain of the near-infrared light and the domain of the infrared light.

Figure 1:
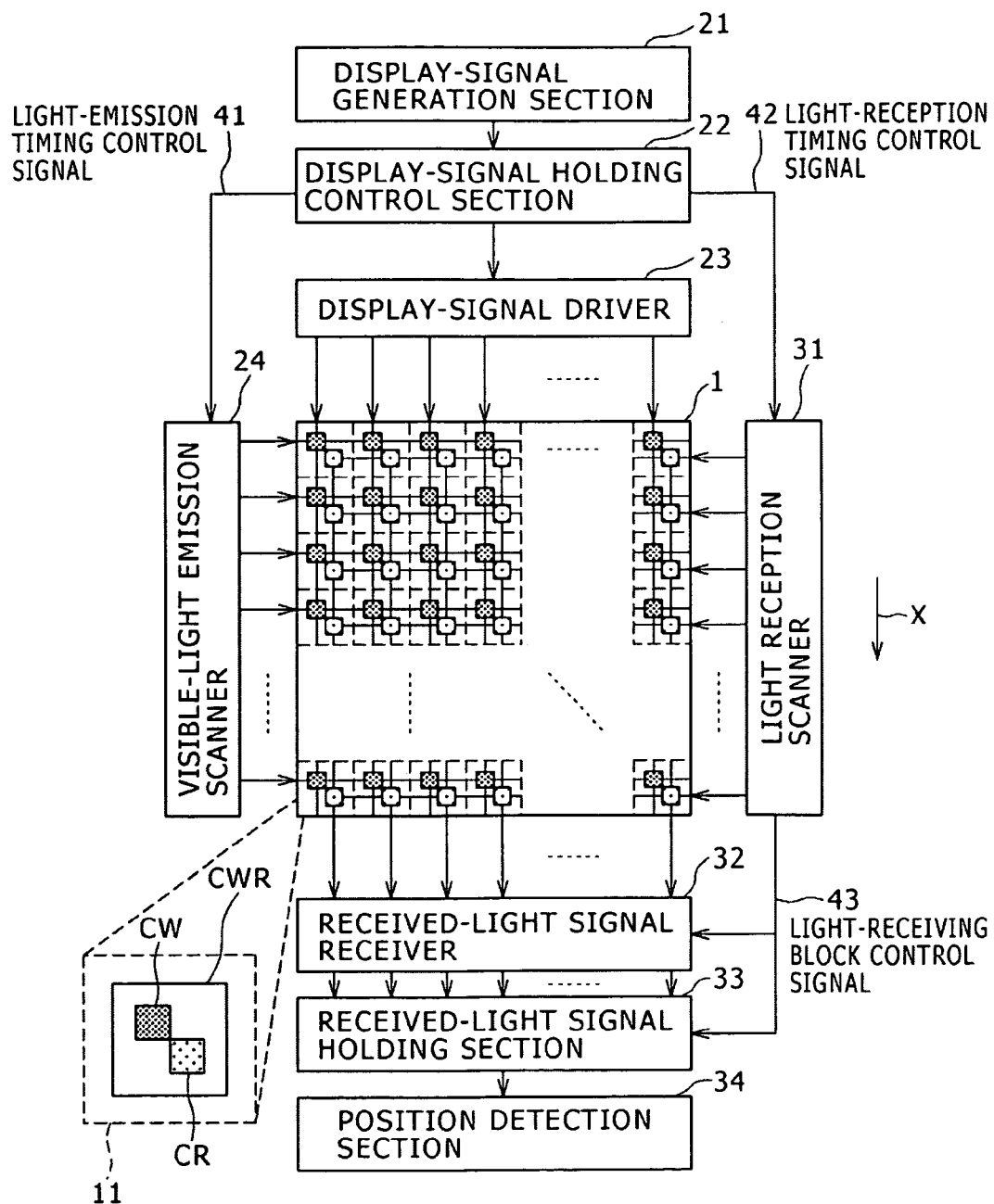
FIG. 1 is a block diagram showing the entire configuration of a liquid-crystal display apparatus according to an embodiment.

FIG. 1 is a block diagram showing the entire configuration of a liquid-crystal display apparatus according to the embodiment. The liquid-crystal display apparatus employs a display section 1, a display-signal generation section 21, a display-signal holding control section 22, a display-signal driver 23, a visible-light emission scanner 24, a light reception scanner 31, a received-light signal receiver 32, a received-light signal holding section 33 and a position detection section 34. The display section 1 is a section for displaying an image based on data of the image. In addition, the liquid-crystal display apparatus is capable of determining the position of an object which is coming into contact with or approaching the display face 10 of the display section 1. In the following description, the object is referred to as a detection-subject object 12.

The display section 1 is an LCD (Liquid Crystal Display) unit which includes a plurality of pixels 11 laid out over the entire display section 1 to form a matrix. As will be described later, by carrying out line-sequential operations, the display section 1 displays an image which is a predetermined figure and/or characters. The pixel 11 has a light-emitting/light-receiving cell CWR including a light emitting sub-cell block CW and a light receiving sub-cell CR. The light emitting sub-cell block CW is a cell capable of generating visible light as well as invisible light whereas the light receiving sub-cell CR is capable of receiving visible light as well as invisible light. Thus, every pixel 11 is capable of carrying out operations to generate and receive light as will be described later. It is to be noted that details of the configuration of the display section 1 will be explained later.

The display-signal generation section 21 is a section for generating a display signal for displaying an image on the display section 1 typically for one screen 11 (or each field) on the basis of image data received from a component such as a CPU (Central Processing Unit) not displayed in the block diagram of FIG. 1. The display-signal generation section 21 outputs the display signal generated in this way to the display-signal holding control section 22.

The display-signal holding control section 22 is a section for holding the display signal generated typically for one screen (or each field) by storing the signal in a field memory such as an SRAM (Static Random Access Memory). The display-signal holding control section 22 also plays the role of a controller for controlling the display-signal driver 23, the visible-light emission scanner 24 and the light reception scanner 31 so that the display-signal driver 23, the visible-light emission scanner 24 and the light reception scanner 31 operate in a state of being interlocked with each other. The visible-light emission scanner 24 is a section for carrying out an operation to drive the light emitting sub-cells CW whereas the light reception scanner 31 is a section for carrying out an operation to drive the light receiving sub-cells CR. To put it concretely, the display-signal holding control section 22 outputs a light-emission timing control signal 41 to the visible-light emission scanner 24 and a light-reception timing control signal 42 to the light reception scanner 31. In addition, the display-signal holding control section 22 provides the display-signal driver 23 with a control signal as well as a display signal for one horizontal line. The display signal for one horizontal line is based on a display signal stored in the field memory employed in the display-signal holding control section 22 as a display signal for one screen. The display-signal holding control section 22 outputs the light-emission timing control signal 41 to the visible-light emission scanner 24 and the light-reception timing control signal 42 to the light reception scanner 31 as well as provides the display-signal driver 23 with a control signal and a display signal for one horizontal line so as to carry out line-sequential operations typically in a direction indicated by an arrow X in the block diagram of FIG. 1 as will be described later.

The visible-light emission scanner 24 is a section for selecting a light emitting sub-cell block CW to serve as a subject of driving in accordance with the light-emission timing control signal 41 received from the display-signal holding control section 22. To put it concretely, the visible-light emission scanner 24 supplies a light emission select signal to the light emitting sub-cell block CW to serve as a subject of driving through a light emission gate line connected to a pixel 11, which is included in the display section 1 as a pixel 11 including the light emitting sub-cell block CW, as a light emission select signal for controlling a light-emitting-device select switch employed in the light emitting sub-cell block CW. That is to say, when a voltage is applied by the light emission select signal supplied to the light emitting sub-cell block CW as a voltage to turn on the light-emitting-device select switch, the pixel 11 including the light emitting sub-cell block CW carries out an operation to emit light with a luminance determined by a voltage received from the display-signal driver 23.

The display-signal driver 23 is a section for supplying a voltage representing display data to a light emitting sub-cell block CW to serve as the subject of driving in accordance with a display signal received from the display-signal holding control section 22 as a display signal for one horizontal line. To put it concretely, the display-signal driver 23 supplies a voltage representing the display data the pixel 11 selected by the visible-light emission scanner 24 through a data supply line connected to a pixel 11 of the display section 1. In this way, the display-signal driver 23 and the visible-light emission scanner 24 carry out a line-sequential operation in a state of being interlocked with each other so that an image based on any arbitrary display data is displayed on the display section 1.

The light reception scanner 31 is a section for selecting a light receiving sub-cell CR to serve as a subject of driving in accordance with the light-reception timing control signal 42 received from the display-signal holding control section 22. To put it concretely, the display-signal driver 23 supplies a light reception select signal to the light receiving sub-cell CR to serve as a subject of driving through a light reception gate line connected to a pixel 11, which is included in the display section 1 for controlling a light-receiving-device select switch. That is to say, in the same manner as the operation of the visible-light emission scanner, when a voltage is applied by the light reception select signal as a voltage to turn on the light-receiving-device select switch, the pixel 11 of the display section 1 carries out an operation to output a received-light signal detected by the pixel 11 to the received-light signal receiver 32. The received light detected by the light receiving sub-cell CR employed in the pixel 11 is visible light and invisible light.

It is to be noted the light reception scanner 31 outputs a light-receiving block control signal 43 to each of the received-light signal receiver 32 and the received-light signal holding section 33 in playing the role of a controller for controlling an operation of portions included in the received-light signal receiver 32 and the received-light signal holding section 33 as portions contributing to an operation to receive light.

The received-light signal receiver 32 is a section for acquiring a received-light signal generated by the light receiving sub-cells CR for one horizontal line in accordance with the light receiving block control signal 43 received from the light reception scanner 31. The received-light signal receiver 32 outputs the received-light signal acquired for one horizontal line in this way to the received-light signal holding section 33.

The received-light signal holding section 33 is a section for reconfiguring the received-light signal received from the received-light signal receiver 32 into a received-light signal for one screen (or every field) in accordance with the light receiving block control signal 43 received from the light reception scanner 31 and holding the received-light signal obtained as a result of the reconfiguration process by storing the reconfigured received-light signal in a field memory such as an SRAM. The received-light signal holding section 33 then outputs the received-light signal stored in the field memory to the position detection section 34. It is to be noted that the received-light signal holding section 33 may employ a storage device other than a digital memory such as the field memory. For example, the received-light signal holding section 33 may store the received-light signal as analog data.

The position detection section 34 is a section for carrying out signal processing to determine typically the position of a detection-subject object coming into contact with or approaching the display face 10 of the display section 1 from the positions of light receiving sub-cells CR each detecting received light on the basis of the received-light signal received from the received-light signal holding section 33 as a signal representing the received light. In this way, the position detection section 34 determines typically the position of a detection-subject object coming into contact with or approaching the display face 10 of the display section 1. It is to be noted that the liquid-crystal display apparatus can also be provided with a configuration in which, if the received-light signal holding section 33 stores the received-light signal in a storage device as analog data as described above, the position detection section 34 carries out an A/D (analog/digital) conversion process of converting the analog data into digital data which is then subjected to the signal processing.

It is also worth noting that the display-signal driver 23 and the visible-light emission scanner 24 are a typical concrete implementation of the display driving section provided by the present invention whereas the light reception scanner 31 is a typical concrete implementation of the light-reception driving section provided by the present invention.

By referring to diagrams of FIGS. 2 to 5, the following description explains details of the configurations of the display section 1 and the light-emitting/light-receiving cell CWR.

Figure 2:
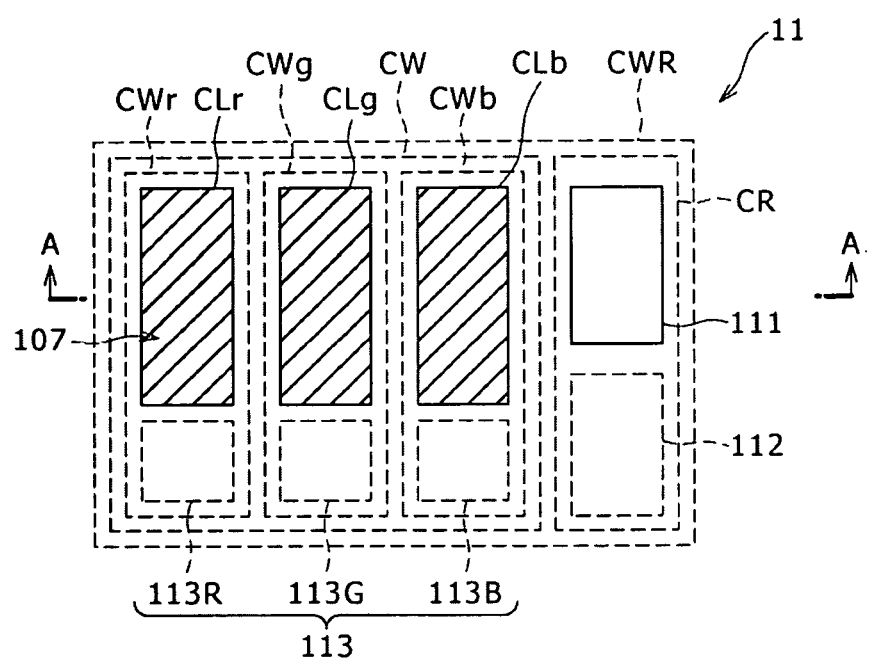
FIG. 2 is a diagram showing a top-view model of a typical configuration of a light-emitting/light-receiving cell of a pixel employed in the liquid-crystal display apparatus shown in the block diagram of FIG. 1.

FIG. 2 is a diagram showing a top view of a typical configuration of the light-emitting/light-receiving cell CWR employed in a pixel 11. As described previously, the light-emitting/light-receiving cell CWR includes a light emitting sub-cell block CW and a light receiving sub-cell CR. The light emitting sub-cell block CW has a red-light emitting sub-cell CWr, a green-light emitting sub-cell CWg and a blue-light emitting sub-cell CWb. The red-light emitting sub-cell CWr includes a red-light emitting device CLr serving as a component for emitting light of the red color and a red-color TFT (Thin Film Transistor) circuit section 113R including the aforementioned red-light emitting device select switch SW1R which is a switch device for driving the red-light emitting device CLr as will be described later. By the same token, the green-light emitting sub-cell CWg includes a green-light emitting device CLg serving as a component for emitting light of the green color and a green-color TFT (Thin Film Transistor) circuit section 113G including the aforementioned green-light emitting device select switch SW1G which is a switch device for driving the green-light emitting device CLg as will be described later. In the same way, the blue-light emitting sub-cell CWb includes a blue-light emitting device CLb serving as a component for emitting light of the blue color and a blue-color TFT (Thin Film Transistor) circuit section 113B including the aforementioned blue-light emitting device select switch SW1B which is a switch device for driving the blue-light emitting device CLb as will be described later. It is to be noted that, as will be explained later in detail, in each of areas for creating the red-light emitting device CLr, the green-light emitting device CLg and the blue-light emitting device CLb, a color filter 107 is placed as shown in a cross-sectional diagram of FIG. 3 so that invisible light is also emitted from each of the areas.

The light receiving sub-cell CR has a light detecting sensor 111 and a light detecting sensor circuit section 112. The light detecting sensor 111 is a light receiving device for detecting visible light and invisible light. The light detecting sensor circuit section 112 includes the aforementioned light receiving device select switch SW2 to be described later as a switch device for driving the light detecting sensor 111. The light detecting sensor 111 is typically a photodiode typically made of single-crystal silicon, poly-crystal silicon (that is, poly-silicon) or amorphous silicon. In the case of the embodiment which makes use of invisible light having wavelengths greater than the wavelength of light in the visible domain, it is desirable to make the light detecting sensor 111 from the single-crystal silicon rather than the poly-crystal silicon or the amorphous silicon. This is because, by making the light detecting sensor 111 from the single-crystal silicon, the wavelength range of receivable light becomes wider. The wavelength range of receivable light is a range of wavelengths not exceeding the value of about 1,100 nm.

It is to be noted that, by referring to the diagram of FIG. 5, later description will explain details of connections between the red-light emitting device CLr and the red-color TFT circuit section 113R, between the green-light emitting device CLg and the green-color TFT circuit section 113G and between the blue-light emitting device CLb and the blue-color TFT circuit section 113B. The description will also explain details as to how the red-color TFT circuit section 113R, the green-color TFT circuit section 113G and the blue-color TFT circuit section 113B are connected to the display-signal driver 23, the visible-light emission scanner 24, the light reception scanner 31 and the received-light signal receiver 32, which have been described before.

Each of the red-light emitting device CLr, the green-light emitting device CLg and the blue-light emitting device CLb is a typical implementation of the liquid-crystal device provided by the present invention whereas the light detecting sensor 111 is a typical implementation of the light receiving device provided by the present invention.

Figure 3:
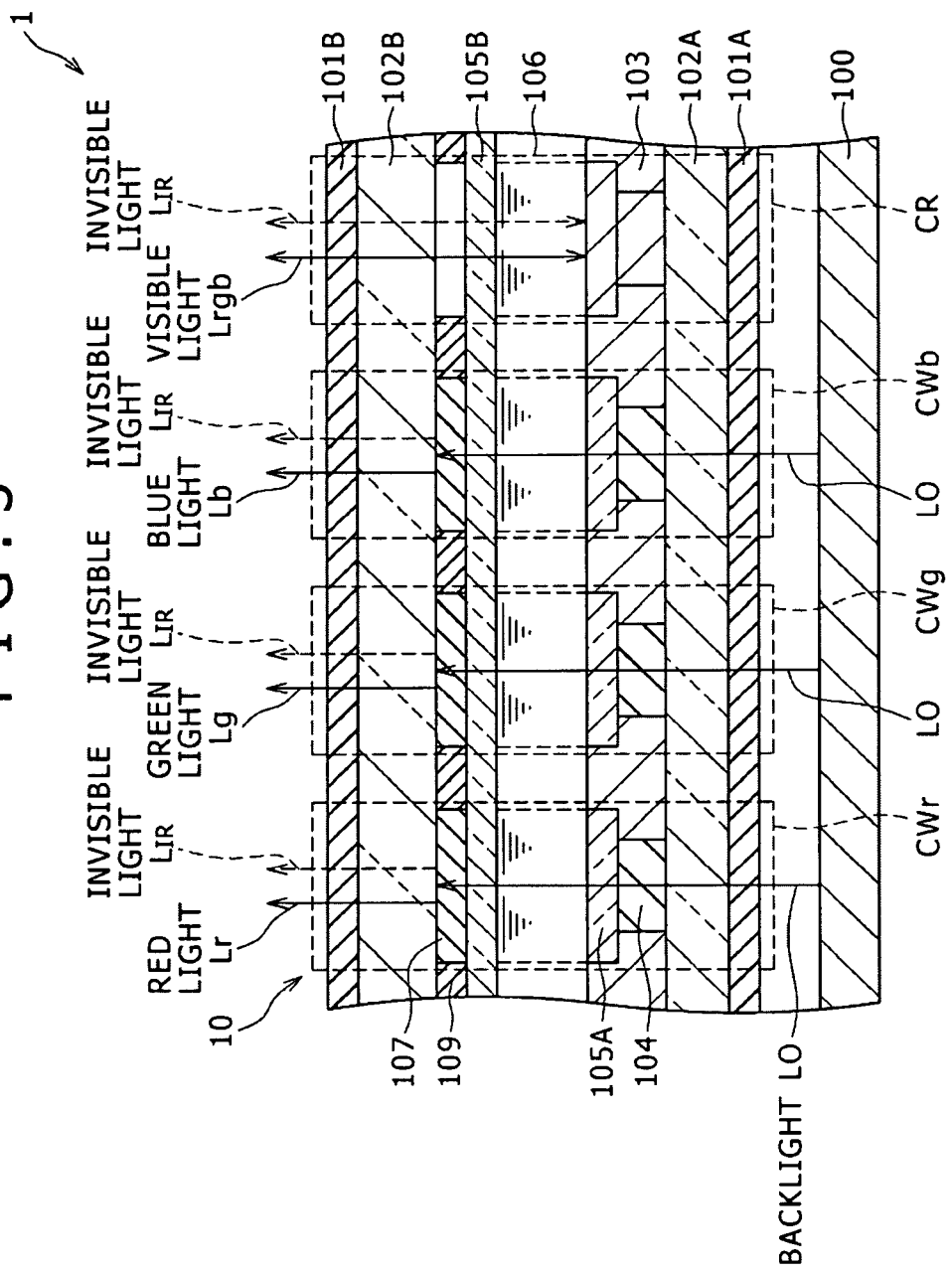
FIG. 3 is a cross-sectional diagram showing a cross section on an A-A portion indicated by arrows A in the diagram of FIG. 2 as a typical cross-sectional model of a display section.

FIG. 3 is a cross-sectional diagram showing a cross section on an A-A face indicated by arrows A in the diagram of FIG. 2 as a typical cross-sectional configuration of the display section 1. The display section 1 has a layered structure including a light source 100 and upper layers provided over the light source 100. The upper layers compose the red-light emitting sub-cell CWr including the red-light emitting device CLr, the green-light emitting sub-cell CWg including the green-light emitting device CLg, the blue-light emitting sub-cell CWb including the blue-light emitting device CLb and the light receiving sub-cell CR including the light detecting sensor 111 functioning as the light receiving device. To put it concretely, the upper layers are a lower polarization plate 101A, a lower glass substrate 102A, a circuit section 103 (including insulation layers 104 and transparent device electrodes 105A), a liquid-crystal layer 106, a transparent common electrode 105B, a layer including color filters 107 and black matrixes 109, an upper glass substrate 102B and an upper polarization plate 101B which are provided over the light source 100 in the bottom-up direction one layer after another. Thus, each of the light emitting devices CLr, CLg and CLb is a liquid-crystal device provided with the liquid-crystal layer 106 sandwiched by the lower and upper glass substrates 102A and 102B which face each other.

The light source 100 is a backlight for generating visible light and invisible light and directing them to the liquid-crystal devices. Each of the lower and upper glass substrates 102A and 102B is a transparent substrate made of a glass material. In place of a glass material, each of the lower and upper glass substrates 102A and 102B can also be made of a plastic material. It is to be noted that the lower and upper glass substrates 102A and 102B are a typical implementation of a pair of transparent substrates provided by the present invention.

The circuit section 103 is a section corresponding to the red-color TFT circuit section 113R, the green-color TFT circuit section 113G, the blue-color TFT circuit section 113B, the light detecting sensor 111 and the light detecting sensor circuit section 112 which are shown in the diagram of FIG. 2. The circuit section 103 is electrically connected to each of the transparent device electrodes 105A. Made of a transparent material such as an ITO (Indium Tin Oxide), each of the transparent device electrodes 105A is provided in one of the red-light emitting sub-cell CWr, the green-light emitting sub-cell CWg and the blue-light emitting sub-cell CWb. The transparent common electrode 105B is a common electrode facing the transparent device electrodes 105A. Much like the transparent device electrodes 105A, the transparent common electrode 105B is also made from a transparent material such as the ITO. Each of the insulation layers 104 is created between portions of the circuit section 103. A voltage according to image data is applied between the transparent device electrodes 105A and the transparent common electrode 105B so that the liquid-crystal layer 106 modulates visible light Lrgb of backlight light LO generated by the light source 100. The visible light Lrgb is the red light Lr, the green light Lg and the blue light Lb.

The color filters 107 are provided in areas associated with the light emitting cells (that is, the red-light emitting sub-cell CWr, the green-light emitting sub-cell CWg and the blue-light emitting sub-cell CWb) as areas on the lower face of the upper glass substrate 102B which is placed on the side close to the display face 10 as shown in the cross-sectional diagram of FIG. 3. The color filters 107 are sections each used for selectively transmitting light components transmitted through the liquid-crystal layer 106 as components of the backlight light LO. The light components include visible light corresponding to color filters 107 transmitting the backlight light LO and invisible light LIR. The visible light is one of the red light Lr, the green light Lg and the blue light Lb. It is to be noted that the color filters 107 are not provided in an area corresponding to the light receiving sub-cell CR.

The black matrixes 109 are provided between the light emitting sub-cells CW as well as between the blue-light emitting sub-cell CWb and the light receiving sub-cell CR. The black matrixes 109 shield the backlight light LO generated by the light source 100 so that the backlight light LO is not radiated to the side of the display face 10.

As described above, the color filters 107 transmit the backlight light LO generated by the light source 100 so that the red-light emitting sub-cell CWr, the green-light emitting sub-cell CWg and the green-light emitting sub-cell CWg emit the red light Lr, the green light Lg and the blue light Lb respectively in addition to the invisible light LIR. To put it in detail, the red-light emitting sub-cell CWr emits the red light Lr and the invisible light LIR, the green-light emitting sub-cell CWg emits the green light Lg and the invisible light LIR whereas the blue-light emitting sub-cell CWb emits the blue light Lb and the invisible light LIR. Since the color filters 107 are not provided in an area corresponding to the light receiving sub-cell CR, on the other hand, the light receiving sub-cell CR is capable of receiving visible light Lrgb and invisible light LIR which are reflected by an object serving as a subject of detection.

Figure 4A:
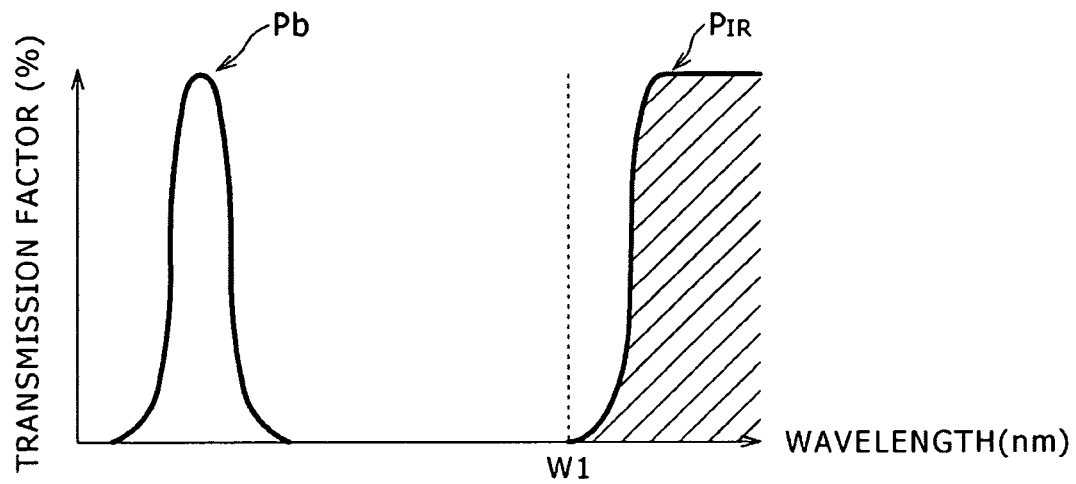
FIGS. 4A to 4C are a plurality of diagrams each showing spectra of different kinds of light emitted by a light emitting sub-cell of the light-emitting/light-receiving cell shown in the diagram of FIG. 2.
Figure 4B:
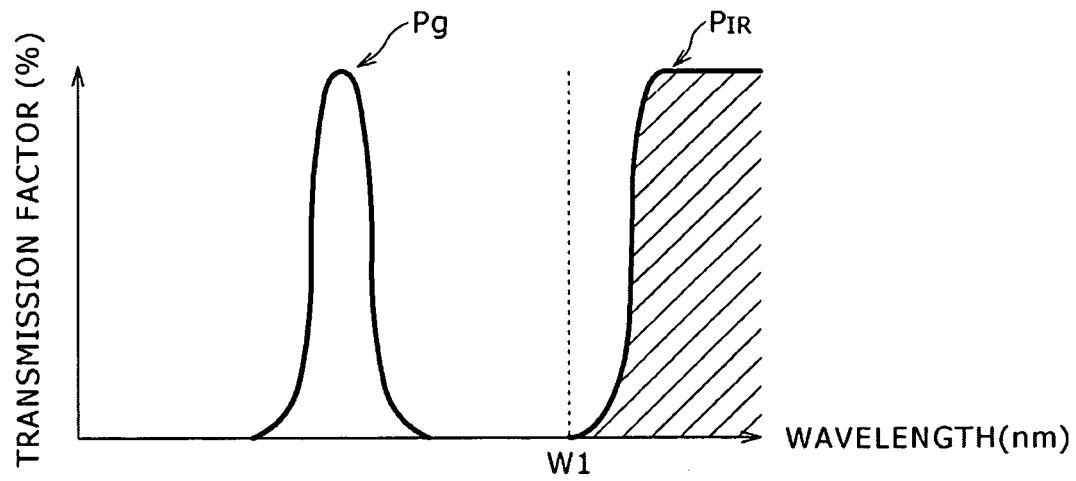
Figure 4C:
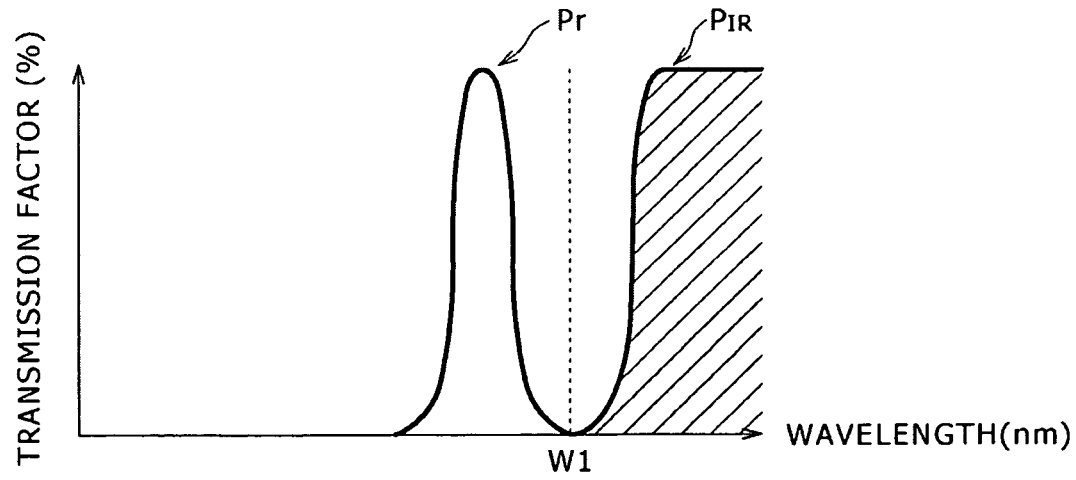

Emitted-light spectra of the visible light Lrgb and the invisible light LIR are shown in diagrams of FIGS. 4A to 4C. To be more specific, the diagram of FIG. 4A shows a spectrum observed in the visible-light domain as an emitted blue light spectrum Pb of the blue light having wavelengths smaller than a threshold wavelength W1 and a spectrum observed in the invisible-light domain as an emitted invisible light spectrum PIR of the invisible light having wavelengths greater than the threshold wavelength W1 for the blue-light emitting sub-cell CWb. By the same token, the diagram of FIG. 4B shows a spectrum observed in the visible-light domain as an emitted green light spectrum Pg of the green light having wavelengths smaller than the threshold wavelength W1 and a spectrum observed in the invisible-light domain as the emitted invisible light spectrum PIR of the invisible light having wavelengths greater than the threshold wavelength W1 for the green-light emitting sub-cell CWg. In the same way, the diagram of FIG. 4C shows a spectrum observed in the visible-light domain as an emitted red light spectrum Pr of the red light having wavelengths smaller than the threshold wavelength W1 and a spectrum observed in the invisible-light domain as the emitted invisible light spectrum PIR of the invisible light having wavelengths greater than the threshold wavelength W1 for the red-light emitting sub-cell CWr.

Figure 5:
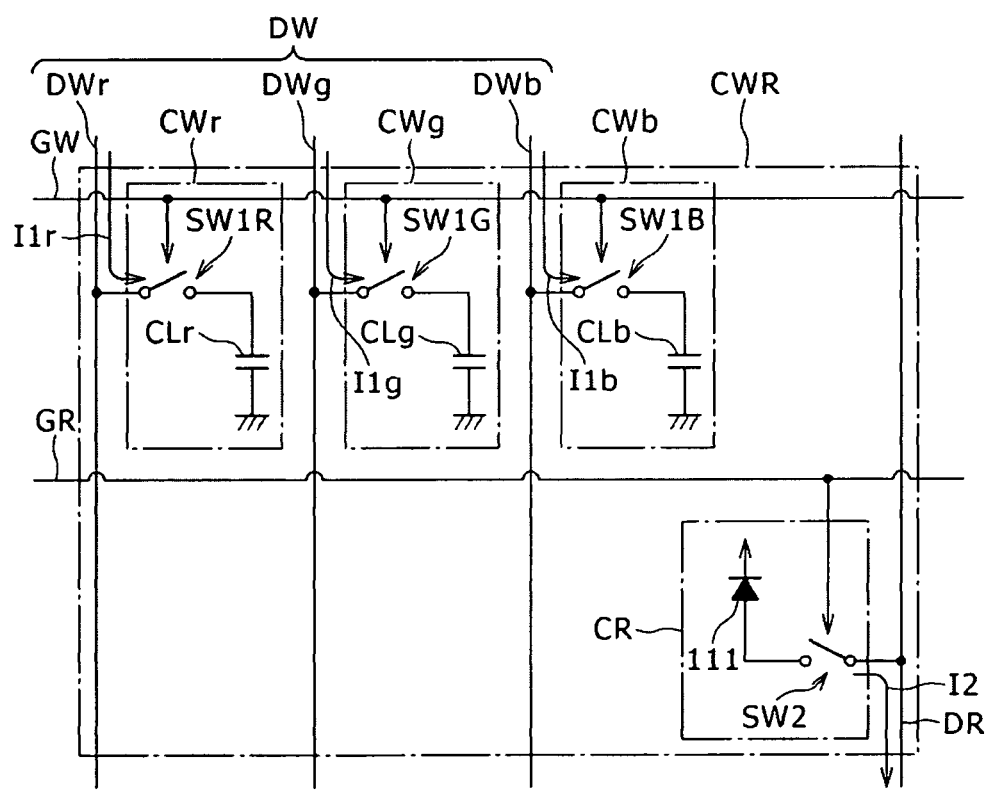
FIG. 5 is a diagram showing a typical circuit configuration of the light-emitting/light-receiving cell employed in each pixel shown in the diagram of FIG. 2.

FIG. 5 is a diagram showing a typical circuit configuration of the light-emitting/light-receiving cell CWR employed in each pixel 11. As described earlier, the light-emitting/light-receiving cell CWR has light emitting sub-cells CW, which include the red-light emitting sub-cell CWr, the green-light emitting sub-cell CWg and the blue-light emitting sub-cell CWb, as well as a light receiving sub-cell CR. The light emitting sub-cells CW are connected to display data supply lines DW linked to the display-signal driver 23 and connected to a light emission gate line GW linked to the visible-light emission scanner 24. To put it concretely, the red-light emitting sub-cell CWr is connected to a red display data supply line DWr and the light emission gate line GW, the green-light emitting sub-cell CWg is connected to a green display data supply line DWg and the light emission gate line GW whereas the blue-light emitting sub-cell CWb is connected to a blue display data supply line DWb and the light emission gate line GW. On the other hand, the light receiving sub-cell CR is connected to a light reception gate line GR linked to the light reception scanner 31 and connected to a data read line DR linked to the received-light signal receiver 32.

The red-light emitting sub-cell CWr employs the red-light emitting device CLr described earlier and the red-light emitting device select switch SW1R provided in the red-color TFT circuit section 113R. By the same token, the green-light emitting sub-cell CWg employs the green-light emitting device CLg described earlier and the green-light emitting device select switch SW1G provided in the green-color TFT circuit section 113G. In the same way, the blue-light emitting sub-cell CWb employs the blue-light emitting device CLb described earlier and the blue-light emitting device select switch SW1B provided in the blue-color TFT circuit section 113B. On the other hand, the light receiving sub-cell CR employs the light detecting sensor 111 and the light receiving device select switch SW2. The light detecting sensor 111 functions as the light receiving device explained previously. In the typical circuit configuration shown in the diagram of FIG. 5, the light detecting sensor 111 is a photodiode. The light receiving device select switch SW2 is a switch provided in the light detecting sensor circuit section 112 described before. It is to be noted that each of the red-light emitting device select switch SW1R, the green-light emitting device select switch SW1G and the blue-light emitting device select switch SW1B is typically a TFT used as a switch device. Each of the red-light emitting device select switch SW1R, the green-light emitting device select switch SW1G and the blue-light emitting device select switch SW1B is created on the same transparent substrate as that of components such as the light detecting sensor 111. In the case of the typical display section 1 shown in the cross-sectional diagram of FIG. 3, the transparent substrate is the lower glass substrate 102A.

Each of the red-light emitting device select switch SW1R, the green-light emitting device select switch SW1G and the blue-light emitting device select switch SW1B is controlled by the light emission gate line GW to carry out operations to enter a turned-on and turned-off states. A specific one of the electrodes of the red-light emitting device select switch SW1R is connected to the red display data supply line DWr whereas the other electrode of the red-light emitting device select switch SW1R is connected to a specific one of the terminals of the red-light emitting device CLr and the other terminal of the red-light emitting device CLr is connected to the ground. To put it concretely, the specific terminal of the red-light emitting device CLr is the transparent device electrode 105A shown in the cross-sectional diagram of FIG. 3 whereas the other terminal of the red-light emitting device CLr is the transparent common electrode 105B shown in the same cross-sectional diagram. By the same token, a specific one of the electrodes of the green-light emitting device select switch SW1G is connected to the green display data supply line DWg whereas the other electrode of the green-light emitting device select switch SW1G is connected to a specific one of the terminals of the green-light emitting device CLg and the other terminal of the green-light emitting device CLg is connected to the ground. To put it concretely, the specific terminal of the green-light emitting device CLg is the transparent device electrode 105A shown in the cross-sectional diagram of FIG. 3 whereas the other terminal of the green-light emitting device CLg is the transparent common electrode 105B shown in the same cross-sectional diagram. In the same way, a specific one of the electrodes of the blue-light emitting device select switch SW1B is connected to the blue display data supply line DWb whereas the other electrode of the blue-light emitting device select switch SW1B is connected to a specific one of the terminals of the blue-light emitting device CLb and the other terminal of the blue-light emitting device CLb is connected to the ground. To put it concretely, the specific terminal of the blue-light emitting device CLb is the transparent device electrode 105A shown in the cross-sectional diagram of FIG. 3 whereas the other terminal of the blue-light emitting device CLb is the transparent common electrode 105B shown in the same cross-sectional diagram.

The light receiving device select switch SW2 is controlled by the light reception gate line GR to carry out operations to enter a turned-on and turned-off states. A specific one of the electrodes of the light receiving device select switch SW2 is connected to the data read line DR whereas the other electrode of the light receiving device select switch SW2 is connected to a specific one of the terminals of the light detecting sensor 111 and the other terminal of the light detecting sensor 111 is connected to the ground or a positive bias point not shown in the circuit diagram of FIG. 5.

In the circuit configuration described above, the light-emitting/light-receiving cell CWR carries out a light emitting operation and a light receiving operation as follows.

First of all, in the light emitting operation carried out by the red-light emitting sub-cell CWr, the green-light emitting sub-cell CWg and the blue-light emitting sub-cell CWb to emit visible light Lrgb and invisible light LIR, a light emission select signal asserted on the light emission gate line GW puts each of the red-light emitting device select switch SW1R, the green-light emitting device select switch SW1G and the blue-light emitting device select switch SW1B provided on one horizontal line in a turned-on state. Then, electric charge representing a display signal is stored in each of the red-light emitting device CLr, the green-light emitting device CLg and the blue-light emitting device CLb through each of paths 11r, 11g and 11b including the red display data supply line DWr, the green display data supply line DWg and the blue display data supply line DWb as well as the red-light emitting device select switch SW1R, the green-light emitting device select switch SW1G and the blue-light emitting device select switch SW1B respectively so that each of the red-light emitting device CLr, the green-light emitting device CLg and the blue-light emitting device CLb emits visible light Lrgb with a luminance according to the display signal and invisible light LIR with a constant luminance.

It is to be noted that in the light emitting operation carried out by each of the red-light emitting sub-cell CWr, the green-light emitting sub-cell CWg and the blue-light emitting sub-cell CWb to emit the invisible light LIR originated by the light source 100, the invisible light LIR is not dependent on the display data conveyed by the display signal. As a matter of fact, the invisible light LIR is always transmitted through each of the red-light emitting device CLr, the green-light emitting device CLg and the blue-light emitting device CLb employed respectively in the red-light emitting sub-cell CWr, the green-light emitting sub-cell CWg and the blue-light emitting sub-cell CWb on the display face. Thus, each of the red-light emitting device CLr, the green-light emitting device CLg and the blue-light emitting device CLb employed respectively in the red-light emitting sub-cell CWr, the green-light emitting sub-cell CWg and the blue-light emitting sub-cell CWb carries out the light emitting operation to emit the invisible light LIR with a constant luminance.

In the light receiving operation carried out by the light receiving sub-cell CR to receive visible light Lrgb and invisible light LIR, on the other hand, a light reception select signal asserted on the light reception gate line GR puts every light receiving device select switch SW2 provided on one horizontal line in a turned-on state. Then, a current with a magnitude determined by the amount of light received by the light receiving sub-cell CR is generated by the light detecting sensor 111 and flows through a path I2 including the light receiving device select switch SW2 to the data read line DR.

It is to be noted that, when neither the light emitting operation to emit visible light Lrgb and invisible light LIR nor the light receiving operation to receive visible light Lrgb and invisible light LIR are carried out, each of the red-light emitting device select switch SW1R, the green-light emitting device select switch SW1G and the blue-light emitting device select switch SW1B as well as the light receiving device select switch SW2 are put in a turned-off state to disconnect the red-light emitting device CLr from the red display data supply line DWr, disconnect the green-light emitting device CLg from the green display data supply line DWg, disconnect the blue-light emitting device CLb from the blue display data supply line DWb and disconnect the light detecting sensor 111 from the data read line DR.

The following description explains a process to detect an object serving as a detection subject coming into contact with or approaching the display face 10 of the display section 1 by dividing the explanation into description of the process carried out in a black display state and description of the process carried out in a normal display state other than the black display state.

Figure 6A:
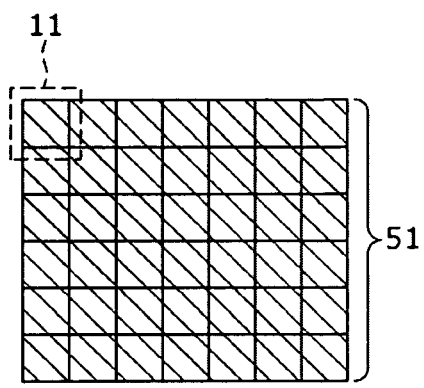
FIGS. 6A to 6C are a plurality of diagrams referred to in description of a typical process to detect a detection-subject object coming into contact with or approaching a display face of the display section by carrying out a line-sequential operation in a normal display state.
Figure 6B:
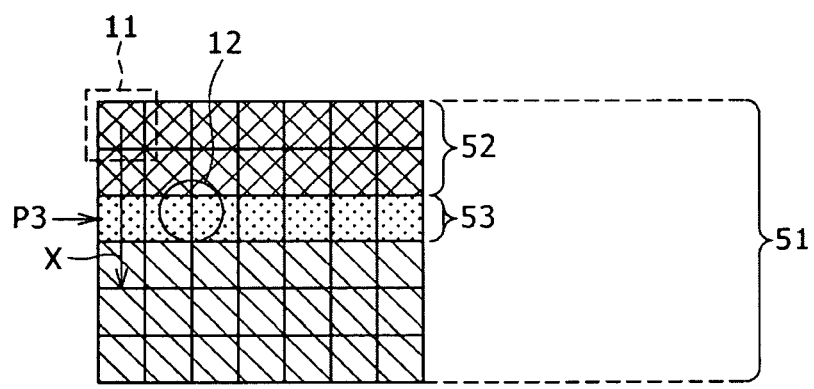
Figure 6C:
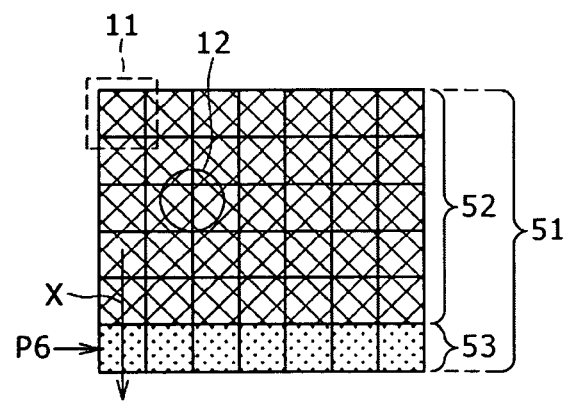
Figure 8A:
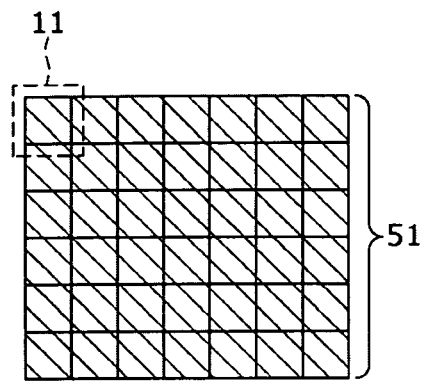
FIGS. 8A to 8C are a plurality of diagrams referred to in description of a typical process to detect a detection-subject object coming into contact with or approaching a display face of the display section by carrying out a line-sequential operation in a black display state.
Figure 8B:
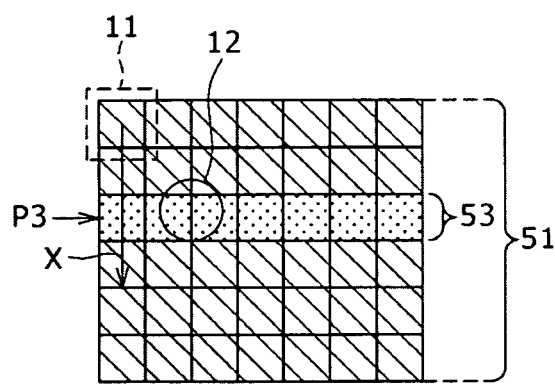
Figure 8C:
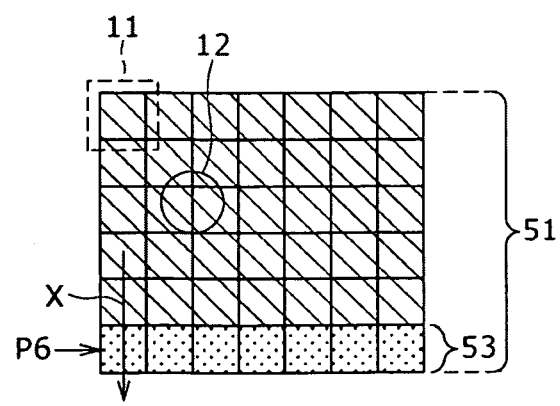

First of all, by referring to diagrams of FIGS. 6 to 8, the following description explains an outline of the process to detect an object serving as a detection subject which is coming into contact with or approaching the display face 10 of the display section 1. FIGS. 6A to 6C are a plurality of diagrams referred to in description of a typical process to detect an object, which serves as a detection subject coming into contact with or approaching the display face 10 of the display section 1, by carrying out a line-sequential operation in a normal display state. FIG. 7 is a cross-sectional diagram showing a cross section of the display section 1 put in a condition corresponding to a black display state. FIGS. 8A to 8C are a plurality of diagrams referred to in description of a typical process to detect an object, which serves as a detection subject coming into contact with or approaching the display face 10 of the display section 1, by carrying out a line-sequential operation in a black display state.

It is to be noted that the black display state is normally defined as a state in which no visible light Lrgb is emitted from pixels 11 on the display section 1. In the following description, however, the black display state is defined as a state in which an image displayed on the display section 1 appears as a black image throughout all the pixels 11 on the display section 1. Each square block shown in the diagrams of FIGS. 6 and 8 represents a pixel 11 on the display section 1.

First of all, by referring to the diagrams of FIGS. 6A to 6C, the following description explains a typical process to detect an object, which serves as a detection subject coming into contact with or approaching the display face 10 of the display section 1, by carrying out a line-sequential operation in a normal display state.

FIG. 6A is a diagram showing a state in which invisible light LIR is radiated from each of the red-light emitting sub-cell CWr, the green-light emitting sub-cell CWg and the blue-light emitting sub-cell CWb always at a constant luminance as described before. Thus, all the pixels 11 on the display section 1 form an invisible-light emitting area 51 shown in the diagram of FIG. 6A.

Each of FIGS. 6B and 6C is a diagram showing a state of carrying out a line-sequential light emitting operation to result in a visible-light emitting area 52 moved in a direction indicated by an arrow X as an area of a plurality of horizontal lines with the emitting light devices CLrgb each performing a light emitting operation and showing a state of carrying out a line-sequential light receiving operation in synchronization with of the line-sequential light emitting operation to result in a visible-light receiving area 53 moved in a direction indicated by the arrow X as an area of one horizontal line with the light receiving sub-cells CR thereof each performing a light receiving operation. The line-sequential light emitting operation and the line-sequential light receiving operation allow the entire display section 1 to display an image by radiating visible light Lrgb in addition to invisible light LIR and to receive the visible light Lrgb as well as the invisible light LIR which are reflected by an object 12 serving as a subject of detection. As the detection-subject object 12 comes into contact with or approaches the display face 10 of the display section 1, the detection-subject object 12 reflects the visible light Lrgb radiated from the visible-light emitting area 52 and the invisible light LIR radiated from the invisible-light emitting area 51. At that time, pixels 11 close to specific pixels 11 radiating the visible light Lrgb and/or the invisible light LIR receive the visible light Lrgb and/or the invisible light LIR which are radiated by the detection-subject object 12. An example of the pixels 11 receiving the visible light Lrgb and/or the invisible light LIR which are radiated by the detection-subject object 12 is pixels 11 on a horizontal line serving as a visible-light receiving area 53 indicated by notation P3 in the diagram of FIG. 6B. On the other hand, pixels 11 far away from the specific pixels 11 radiating the visible light Lrgb and/or the invisible light LIR do not receive the visible light Lrgb and/or the invisible light LIR which are radiated by the detection-subject object 12. Example of the pixels 11 not receiving the visible light Lrgb and/or the invisible light LIR which are radiated by the detection-subject object 12 are pixels 11 on a horizontal line serving as a visible-light receiving area 53 indicated by notation P6 in the diagram of FIG. 6C. Thus, the light detecting sensor 111 of each pixel 11 at a location in close proximity to the detection-subject object 12 generates a received-light signal. On the other hand, the light detecting sensor 111 of each pixel 11 at a location far away from the detection-subject object 12 does not generate a received-light signal. As a result, a position on the display section 1 can be detected as a position which the detection-subject object 12 is coming into contact with or approaching.

As described above, each horizontal line is subjected to the line-sequential light emitting operation in order to radiate visible light Lrgb as well as invisible light LIR and subjected to the line-sequential light receiving operation in order to detect the visible light Lrgb and the invisible light LIR which are reflected by a detection-subject object 12. By carrying out the line-sequential light emitting operation and the line-sequential light receiving operation in this way, the entire display section 1 is capable of serving as a light emitting area and a light receiving area so that, on the basis of a received-light signal generated by the light detecting sensor 111 as a signal representing detected received light, it is possible to display image data on the entire display section 1 and determine whether or not the detection-subject object 12 exists at a location in close proximity to the display section 1 and, if the detection-subject object 12 is determined to exist at a location in close proximity to the display section 1, detect the location.

In the case of the black display state, all the pixels 11 show a black display as described before. That is to say, in the red-light emitting sub-cell CWr, the green-light emitting sub-cell CWg and the blue-light emitting sub-cell CWb, the liquid-crystal layer 106 modulates respectively the red light Lr, green light Lg and blue light Lb of the backlight light LO generated by the light source 100 but the upper polarization plate 101B shields the modulated red light Lr, green light Lg and blue light Lb as shown in the diagram of FIG. 7. In the mean time, in the red-light emitting sub-cell CWr, the green-light emitting sub-cell CWg and the blue-light emitting sub-cell CWb, the liquid-crystal layer 106 does not modulate respectively the invisible light LIR of the backlight light LO generated by the light source 100 and the upper polarization plate 101B transmits the invisible light LIR also as shown in the diagram of FIG. 7. Thus, the display section 1 always radiates the invisible light LIR at a fixed luminance. As a result, even in the case of the black display state, by making use of the invisible light LIR radiated by the invisible-light emitting area 51 as described above by referring to the diagrams of FIGS. 8A to 8C, the position of the detection-subject object 12 can be determined in the same way as the normal display state shown in the diagrams of FIGS. 6A to 6C. In this way, the position of the detection-subject object 12 can be determined without being affected by luminance changes caused by the image data and the utilization condition of the liquid-crystal display apparatus. The utilization condition of the liquid-crystal display apparatus includes the state of the environment surrounding the liquid-crystal display apparatus. Examples of the state of the environment surrounding the liquid-crystal display apparatus are dark and bright states of the environment.

By referring to a timing diagram of FIGS. 9A to 9F, the following description explains details of a process carried out by the liquid-crystal display apparatus shown in the diagram of FIG. 1 as a process to determine the position of a detection-subject object 12 by dividing the explanation into description of the process carried out in a black display state and description of the process carried out in a normal display state other than the black display state. The timing diagram of FIGS. 9A to 9F includes a plurality of timing charts showing timings of the process carried out by the liquid-crystal display apparatus shown in the diagram of FIG. 1 as a process to determine the position of a detection-subject object 12. To be more specific, FIG. 9A is a timing chart for a signal asserted on a display data supply line DWi whereas FIG. 9B is a timing chart for invisible light LIR radiated by a light-emitting/light-receiving cell CWRi. FIG. 9C is a plurality of timing charts for pulses asserted on the light emission gate lines GW (that is, the light emission gate lines GW1 to GWn) corresponding to the first to nth horizontal lines respectively. FIG. 9D is a plurality of timing charts for pulses asserted on the light reception gate lines GR (that is, the light reception gate lines GR1 to GRn) corresponding to the first to nth horizontal lines respectively. FIG. 9E is a plurality of timing charts for periods TRW and TW of the light-emitting/light-receiving cells CWRi (that is, the light-emitting/light-receiving cells CWRi1 to CWRin) corresponding to the first to nth horizontal lines respectively. The periods TRW and TW will be described later. FIG. 9F is a timing chart for a signal appearing on a data read line DRi connected to the light-emitting/light-receiving cells CWRi. Each of notations i, j, n and m used in the timing diagram of FIGS. 9A to 9F is an integer denoting a location.

The horizontal axis of the timing diagram of FIGS. 9A to 9F represents the lapse of time. Each of vertical periods TH1 and THm shown on the top of the timing diagram of FIGS. 9A to 9F represents the time it takes to scan the entire display section 1 in the normal display state and the black display state respectively. That is to say, each of the vertical periods TH1 and THm represents the time necessary for the visible-light emission scanner 24 to assert pulses on the light emission gate lines GW1 to GWn as shown in the timing charts of FIG. 9C in order to scan the entire display section 1 and the light reception scanner 31 to assert pulses on the light reception gate lines GR1 to GRn as shown in the timing charts of FIG. 9D in order to scan the entire display section 1. The detection-subject object 12 is assumed to be located at a position in close proximity to the light-emitting/light-receiving cells CWRi(j−1), CWRij and CWRi(j+1) on the display section 1. Thus, received light is detected by the light-emitting/light-receiving cells CWRi(j−1), CWRij and CWRi(j+1) and received-light signals are generated by the light-emitting/light-receiving cells CWRi(j−1), CWRij and CWRi(j+1) during TRW periods of the light-emitting/light-receiving cells CWRi(j−1), CWRij and CWRi(j+1), that is, during a received-light signal detection period TF1 between times t3 and t6 in the normal display state vertical period TH1 as well as during a received-light signal detection period TFm between times t8 and t11 in the black display state vertical period THm as shown in the timing chart of FIG. 9F. The signal asserted on the display data supply line DWi as shown in the timing chart of FIG. 9A represents data determining the luminance of light generated by every pixel 11 connected to the display data supply line DWi. The vertical period TH1 is the length of the normal display state whereas the vertical period THm is the length of the black display state. FIG. 9B is a timing chart for the luminance of invisible light LIR radiated by a light-emitting/light-receiving cell CWRi, that is, the amount of the invisible light LIR. The period TRW shown in each timing chart of FIG. 9E is a light-emission/light-reception period during which visible light Lrgb and invisible light LIR are emitted and received by the light-emitting/light-receiving cell CWRi. The period TW shown in each timing chart of FIG. 9E is a light-emission period during which visible light Lrgb is emitted by the light-emitting/light-receiving cell CWRi.

The processing carried out with timings shown in the timing diagram of FIGS. 9A to 9F is typical scanning in a light emitting operation carried out by the visible-light emission scanner 24 and typical scanning in a light receiving operation carried out by the light reception scanner 31 by execution of line sequence operations with the same timing on the same horizontal line. However, it is also possible to provide a configuration in which the scanning in a light emitting operation to emit visible light Lrgb and invisible light LIR is carried out independently of the scanning in a light receiving operation to receive visible light Lrgb and invisible light LIR. In addition, the signal appearing on the data read line DRi connected to the light-emitting/light-receiving cells CWRi as shown in the timing chart of FIG. 9F is stored in the received-light signal holding section 33 typically as an analog signal. As described previously, however, it is also possible to provide a configuration in which the signal is stored in the received-light signal holding section 33 typically as digital data.

First of all, the normal display state indicated by the vertical period TH1 is explained.

In a period between times t0 and t1, no select signal is provided to each light emission gate line GW and each light reception gate line GR. Thus, during this period, every light emitting device select switch SW1 and the light receiving device select switch SW2 which are employed in the light-emitting/light-receiving cell CWRi are each in a turned-off state. As a result, the red-light emitting device CLr is electrically disconnected from the red display data supply line DWr, the green-light emitting device CLg is electrically disconnected from the green display data supply line DWg, the blue-light emitting device CLb is electrically disconnected from the blue display data supply line DWb and the light detecting sensor 111 is electrically disconnected from the data read line DR. Accordingly, each light-emitting/light-receiving cell CWRi is in a state of halting the light emitting operation to emit visible light Lrgb. However, each light-emitting/light-receiving cell CWRi is emitting invisible light LIR at a constant luminance as shown in the timing chart of FIG. 9B.

In a next period between the time t1 and a time t2, a light emission select signal is supplied to the light emission gate line GW1 whereas a light reception select signal is supplied to the light reception gate line GR1 in order to simultaneously turn on every light emitting device select switch SW1 and the light receiving device select switch SW2 which are employed in each of the light-emitting/light-receiving cells CWR11, CWR21, - - - and CWRm1 connected to the light emission gate line GW1 and the light reception gate line GR1. In the light-emission/light-reception period TRW shown in the timing diagram of FIGS. 9A to 9F as the period between the times t1 and t2, each of the red-light emitting device CLr, the green-light emitting device CLg and the blue-light emitting device CLb which are employed respectively in the red-light emitting sub-cell CWr, green-light emitting sub-cell CWg and blue-light emitting sub-cell CWb of the light-emitting/light-receiving cell CWRi carries out a light emitting operation to emit respectively red light Lr, green light Lg and blue light Lb with a luminance determined by the signal asserted on the display data supply line DWi whereas the light detecting sensor 111 employed in the light-receiving sub-cell CR of the light-emitting/light-receiving cell CWRi carries out a light receiving operation to supply a current with a magnitude determined by the amount of light received by the light detecting sensor 111 to the data read line DRi. It is to be noted that, in the light-emission/light-reception period TRW between the times t1 and t2, a received-light signal indicating the existence of a detection-subject object 12 is not detected. Thus, no signal is detected from the data read line DRi.

In a period after the time t2, in the same way as the light-emission/light-reception period TRW between the times t1 and t2, a light emission select signal is supplied to the light emission gate line GW2 whereas a light reception select signal is supplied to the light reception gate line GR2, a light emission select signal is supplied to the light emission gate line GW3 whereas a light reception select signal is supplied to the light reception gate line GR3 and so on in order to carry out line-sequential light emitting and receiving operations. However, a received-light signal indicating the existence of a detection-subject object 12 is not detected either. Thus, no signal is detected from the data read line DRi. It is to be noted that every light-emitting/light-receiving cell CWRi sustains the light-emission period TW for a fixed time period after the end of the light-emission/light-reception period TRW.

In the next received-light signal detection period TF1 between times t3 and t6, each of the light-emitting/light-receiving cells CWRi(j−1), CWRij and CWRi(j+1) receives light reflected by a detection-subject object 12. Each of the light-emitting/light-receiving cells CWRi(j−1), CWRij and CWRi(j+1) converts the received light into a current having a magnitude determined by the amount of the received light and outputs the current to the data read line DRi connected to the light-emitting/light-receiving cell CWRi (receiving-light signal detection period TF1). It is to be noted that, in this case, the light received by each of the light-emitting/light-receiving cells CWRi(j−1), CWRij and CWRi(j+1) from the detection-subject object 12 includes visible light Lrgb and invisible light LIR which were radiated by the red-light emitting sub-cell CWr, the green-light emitting sub-cell CWg and the blue-light emitting sub-cell CWb. Thus, the magnitude of the current output to the data read line DRi is determined by the intensities of the visible light Lrgb and the invisible light LIR which were emitted by the light-emitting/light-receiving cells CWRi. As described before, the intensity of the visible light Lrgb is determined by a signal asserted on the display data supply line DWi.

In the same way as the period between the times t1 and t3, in a period between the time t6 and a time t7, a light emission select signal is supplied to the light emission gate line GWj+2 whereas a light reception select signal is supplied to the light reception gate line GRj+2, a light emission select signal is supplied to the light emission gate line GWj+3 whereas a light reception select signal is supplied to the light reception gate line GRj+3 - - - and a light emission select signal is supplied to the light emission gate line GWn whereas a light reception select signal is supplied to the light reception gate line GRn in order to carry out line-sequential light emitting and receiving operations. However, a received-light signal indicating the existence of a detection-subject object 12 is not detected either. Thus, no signal is detected from the data read line DRi.

As described above, it is thus possible to detect the existence of a detection-subject object 12 at a location in close proximity to the light-emitting/light-receiving cells CWRi(j−1), CWRij and CWRi(j+1) during the received-light signal detection period TF1 within the normal display state vertical period TH1.

Also in the black display state vertical period THm of the black display state, operations basically identical with the operations in the normal display state vertical period TH1 of the normal display state are carried out. That is to say, each of the red-light emitting device CLr, the green-light emitting device CLg and the blue-light emitting device CLb which are employed respectively in the red-light emitting sub-cell CWr, green-light emitting sub-cell CWg and blue-light emitting sub-cell CWb of the light-emitting/light-receiving cell CWRi carries out a light emitting operation to emit respectively red light Lr, green light Lg and blue light Lb with a luminance determined by the signal asserted on the display data supply line DWi whereas the light detecting sensor 111 employed in the light-receiving sub-cell CR of the light-emitting/light-receiving cell CWRi carries out a light receiving operation to supply a current with a magnitude determined by the amount of light received by the light detecting sensor 111 to the data read line DRi. In the case of the black display state, however, a luminance determined by a signal asserted on the display data supply line DWi as the luminance of emitted visible light is about 0 so that the light detecting sensor 111 receives only invisible light LIR reflected by the detection-subject object 12. That is to say, each of the light-emitting/light-receiving cells CWRi(j−1), CWRij and CWRi(j+1) receives only invisible light LIR reflected by the detection-subject object 12 so that the magnitude of a current signal output to the data read line DRi is determined by the intensity of the invisible light LIR. In this way, in the received-light signal detection period TFm within the black display state vertical period THm of the black display state, a current signal is output to the data read line DRi so that it is also possible to detect the existence of a detection-subject object 12 at a location in close proximity to the light-emitting/light-receiving cells CWRi(j−1), CWRij and CWRi(j+1).

As described above, in the liquid-crystal display apparatus according to the embodiment, the light source 100 generates backlight light LO including visible light Lrgb and invisible light LIR. Then, each of liquid-crystal devices laid out on the display face 10 to serve as a red-light emitting device CLr, a green-light emitting device CLg and a blue-light emitting device CLb modulates the visible light Lrgb generated by the light source 100 on the basis of the data of an image, which is to be displayed, in accordance with display driving operations carried out by the display-signal driver 23 and the visible-light emission scanner 24, radiating the modulated visible light Lrgb from the display face 10 as display light. On the other hand, each of liquid-crystal devices laid out on the display face 10 to serve as the red-light emitting device CLr, the green-light emitting device CLg and the blue-light emitting device CLb transmits the invisible light LIR generated by the light source 100 and radiates the invisible light LIR from the display face 10. If a detection-subject object 12 is coming into contact with or approaching the display face 10 at that time, the detection-subject object 12 reflects the visible light Lrgb and the invisible light LIR, which were radiated from the display face 10. A light detecting sensor 111 on the display face 10 carries out a light receiving operation in accordance with control executed by the light reception scanner 31, detecting the reflected visible light Lrgb and invisible light LIR as detected light. Finally, the position of the detection-subject object 12 is determined on the basis of a received-light signal generated by the light detecting sensor 111 as a signal with a magnitude according to the amount of the detected light. In this way, the position of the detection-subject object 12 can be determined without being affected by luminance changes caused by the image data and the utilization condition of the liquid-crystal display apparatus. The utilization condition of the liquid-crystal display apparatus includes the state of the environment surrounding the liquid-crystal display apparatus. Examples of the state of the environment surrounding the liquid-crystal display apparatus are dark and bright states of the environment.

In addition, the detected light can be recognized in a simple configuration obviating a need for a component such as a touch panel to be provided specially.

On top of that, in the liquid-crystal display apparatus according to the embodiment, as shown in the cross-sectional diagrams of FIGS. 3 and 7, each of liquid-crystal devices laid out on the display face 10 to serve as the red-light emitting device CLr included in the red-light emitting sub-cell CWr, the green-light emitting device CLg included in the green-light emitting sub-cell CWg and the blue-light emitting device CLb included in the blue-light emitting sub-cell CWb transmits the invisible light LIR generated by the light source 100 and radiates the invisible light LIR from the display face 10.

Figure 10:
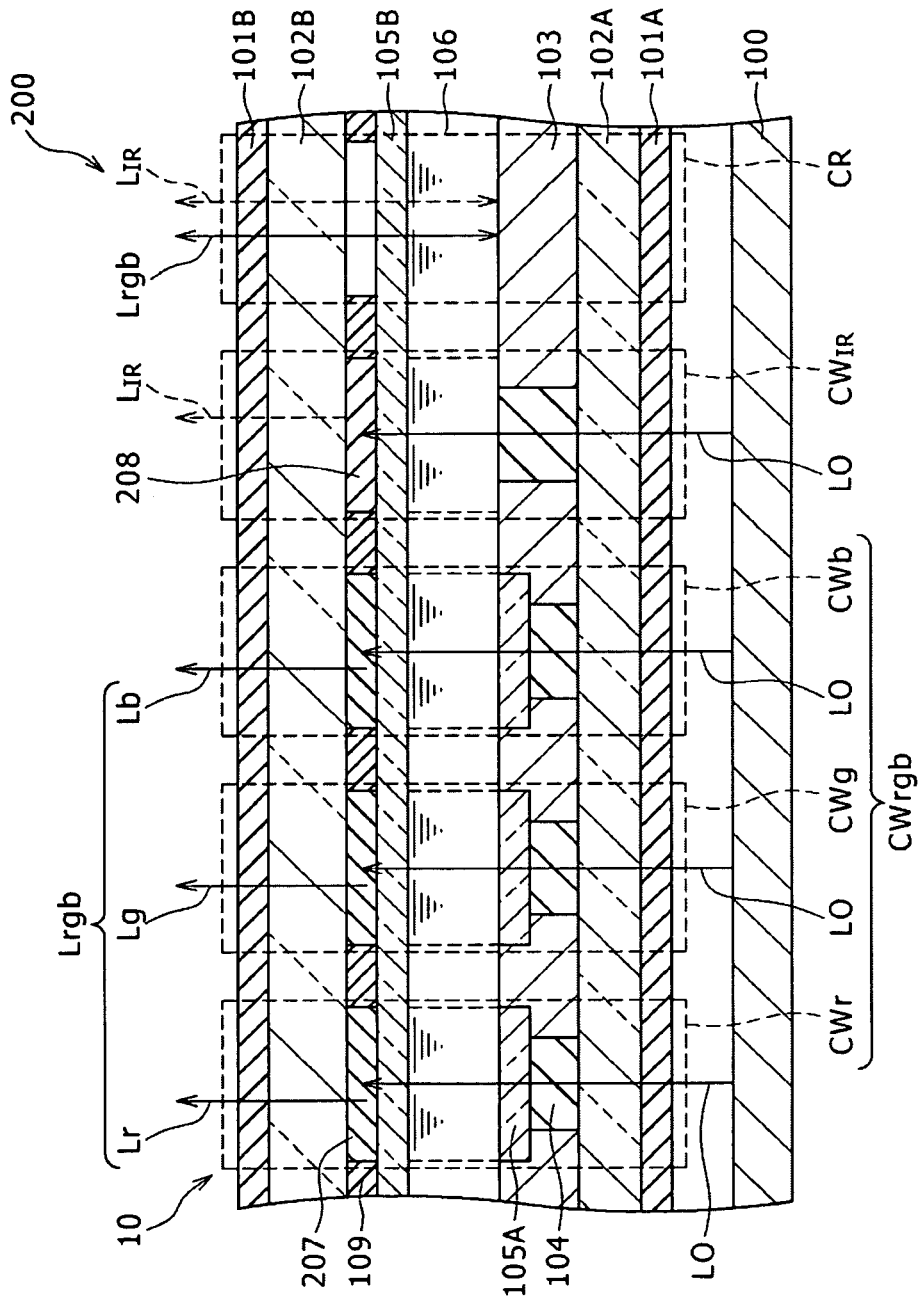
FIG. 10 is a cross-sectional diagram showing a cross section of a display section employed in a comparison liquid-crystal display apparatus which serves as a comparison liquid-crystal display apparatus.

By the way, FIG. 10 is a cross-sectional diagram showing a cross section of a display section employed in a comparison liquid-crystal display apparatus 200 which serves as a liquid-crystal display apparatus to be compared with the liquid-crystal display apparatus according to the embodiment. The comparison liquid-crystal display apparatus 200 employs visible-light emitting sub-cells CWrgb and an invisible-light emitting sub-cell CWIR. The visible-light emitting sub-cells CWrgb are a red-light emitting sub-cell CWr, a green-light emitting sub-cell CWg and a blue-light emitting sub-cell CWb. A visible-light select/transmit filter 207 included in each of the red-light emitting sub-cell CWr, the green-light emitting sub-cell CWg and the blue-light emitting sub-cell CWb selectively emits visible light Lrgb by selecting red light Lr, green light Lg or blue lb from backlight light LO generated by the light source 100. On the other hand, an invisible-light select/transmit filter 208 included in the invisible-light emitting sub-cell CWIR selectively emits invisible light LIR by selecting the invisible light LIR from the backlight light LO generated by the light source 100. Thus, in the case of the comparison liquid-crystal display apparatus 200, the invisible light LIR selected from the backlight light LO generated by the light source 100 is radiated only from a partial area on the display face 10. This partial area on the display face 10 is a radiation area dedicated to radiation of invisible light LIR as an area corresponding to the invisible-light emitting sub-cell CWIR. In comparison with the comparison liquid-crystal display apparatus 200, the liquid-crystal display apparatus according to the embodiment is capable of improving the efficiency of utilization of the invisible light LIR included in the backlight light LO generated by the light source 100 serving as a backlight.

As described above, invisible light LIR is radiated from the display face 10 and reflected by a detection-subject object 12 back to the display face 10 as detected light. Then, on the basis of the detected light obtained as a result of detecting the reflected invisible light LIR, the existence of the detection-subject object 12 is detected. Thus, the position of the detection-subject object 12 can be determined with a high degree of reliability without being affected by the utilization condition of the liquid-crystal display apparatus. In addition, the detected light can be recognized in order to determine typically the position of the detection-subject object 12 in a simple configuration obviating a need for a component such as a touch panel to be provided specially. On top of that, the invisible light LIR generated by the light source 100 is transmitted through the display face 10, being radiated from the display face 10. It is thus possible to improve the efficiency of utilization of the invisible light LIR radiated from the display face 10. As a result, the liquid-crystal display apparatus according to the present embodiment is capable of reliably detecting the detection-subject object 12 by making use of a simple configuration independently of the apparatus utilization state without excessively increasing the power consumption of the liquid-crystal display apparatus.

In addition, the light detecting sensor 111 employed in the light receiving sub-cell CR receives visible light Lrgb reflected by the detection-subject object 12 as well as invisible light LIR reflected by a detection-subject object 12. Thus, besides the process carried out by the liquid-crystal display apparatus according to the embodiment to detect the existence of a detection-subject object 12, for example, a process to acquire the image of an external object can also be performed. That is to say, the present invention can also be applied to a scanner.

On top of that, each light emitting sub-cell block CW emits invisible light LIR always at a fixed luminance so that each of the red-light emitting sub-cell CWr, the green-light emitting sub-cell CWg, the blue-light emitting sub-cell CWb and the light receiving sub-cell CR does not require a select switch other than the light emitting device select switch SW1 and the light receiving device select switch SW2. Thus, the configuration of the light-emitting/light-receiving cell CWR can be made simpler.

Figure 11:
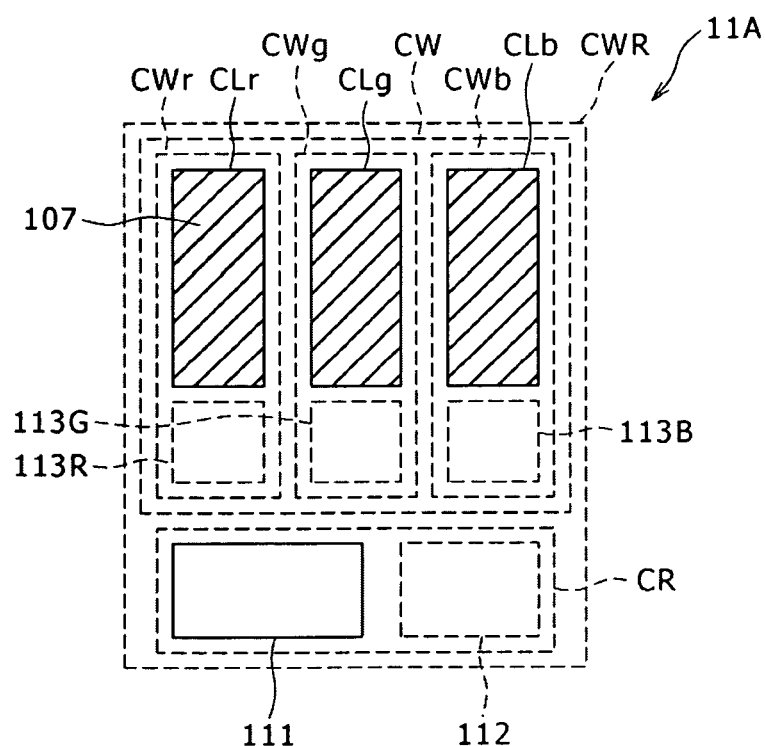
FIG. 11 is a diagram showing a top-view model of a typical configuration of a light-emitting/light-receiving cell of a pixel of another example.

As described so far, the embodiment implements a configuration in which the light-emitting/light-receiving cell CWR of each pixel 11 employs a red-light emitting sub-cell CWr, a green-light emitting sub-cell CWg, a blue-light emitting sub-cell CWb and a light receiving sub-cell CR in a layout shown in the diagram of FIG. 2. It is to be noted, however, that a layout like one shown in a diagram of FIG. 11 as a layout of a pixel 11A can also be adopted. In the layout shown in the diagram of FIG. 11 as the layout of the light-emitting/light-receiving cell CWR employed in the pixel 11A, the light receiving sub-cell CR is placed at a location beneath the red-light emitting sub-cell CWr, the green-light emitting sub-cell CWg and the blue-light emitting sub-cell CWb.

Figure 12A:
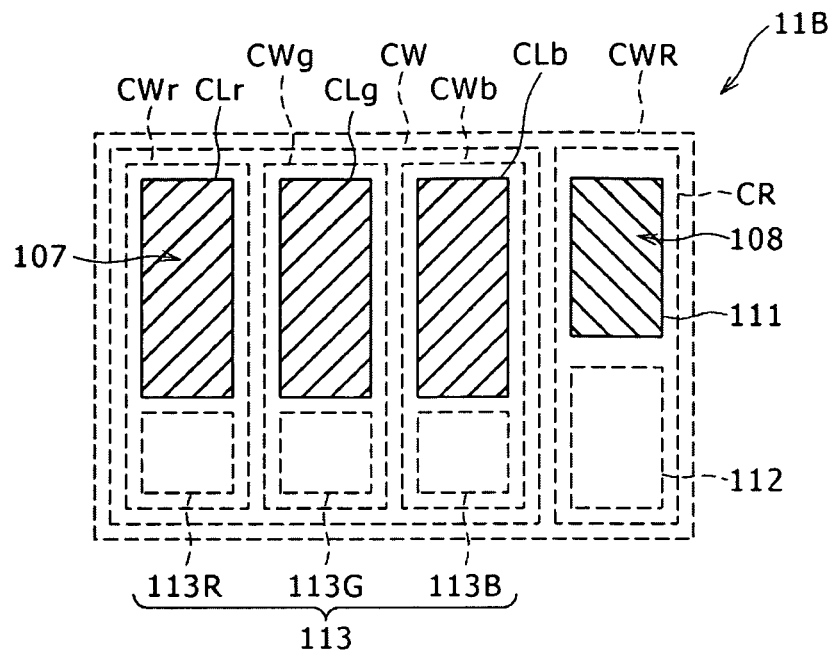
FIGS. 12A and 12B are a plurality of diagrams each showing a typical layout of a pixel of still another example.
Figure 12B:
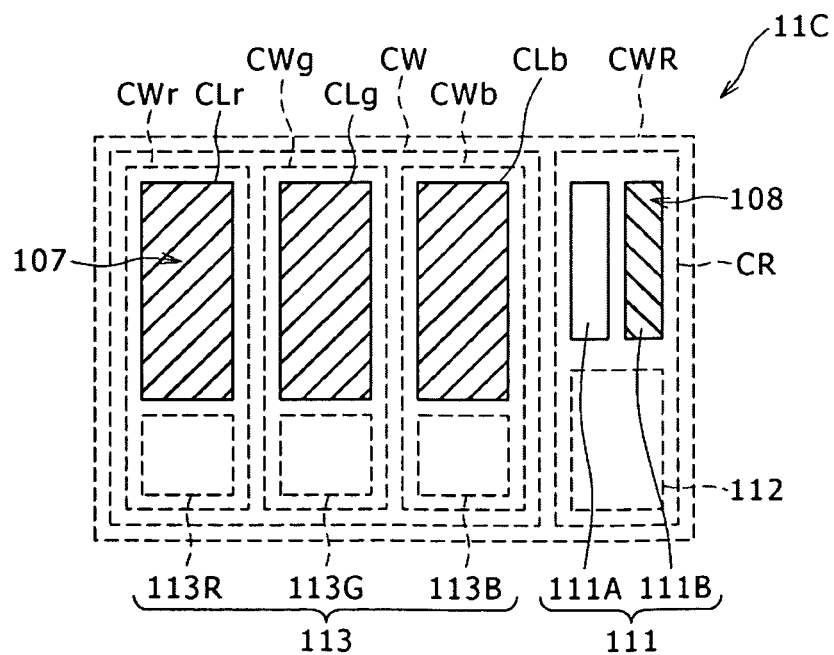

In addition, in the embodiment, the light detecting sensor 111 receives visible light Lrgb reflected by the detection-subject object 12 as well as invisible light LIR reflected by a detection-subject object 12. FIGS. 12A and 12B are a plurality of diagrams each showing a typical layout of a pixel 11. To be more specific, FIG. 12A is a diagram showing a typical layout of a pixel 11B including an invisible-light select/transmit filter 108 for selectively transmitting invisible light LIR in an area corresponding to the light detecting sensor 111. In the case of the layout shown in the diagram of FIG. 12A as a layout including an invisible-light select/transmit filter 108 in an area corresponding to the light detecting sensor 111, the light detecting sensor 111 receives only invisible light LIR. In such a layout, the effect of the visible light Lrgb can thus be eliminated so that the existence of the detection-subject object 12 can be detected with a higher degree of reliability.

On the other hand, FIG. 12B is a diagram showing a typical layout of a pixel 11C in which the light detecting sensor 111 included in the light receiving sub-cell CR is divided into a plurality of light-receiving sub-sensors. In the case of the pixel 11C, the light detecting sensor 111 included in the light receiving sub-cell CR is divided into two light-detecting sub-sensors 111A and 111B. The light detecting sub-sensor 111A is a sensor for detecting both visible light Lrgb and invisible light LIR whereas the light detecting sub-sensor 111B is a sensor for detecting invisible light LIR only. In this case, the pixel 11C can be driven to switch the light receiving sub-cell CR from the light detecting sub-sensor 111A to the light detecting sub-sensor 111B and vice versa. With the light receiving sub-cell CR made capable of detecting both visible light Lrgb and invisible light LIR or detecting invisible light LIR only in such a configuration, it is possible to freely switch the processing carried out by the liquid-crystal display apparatus from a process to acquire the image of an external object by detecting both visible light Lrgb and invisible light LIR to a process to detect the existence of a detection-subject object 12 by detecting invisible light LIR only in the same way as the embodiment described earlier and vice versa.

It is to be noted that the light detecting sub-sensor 111A can also be provided with a visible-light select/transmit filter which is not shown in the layout diagram of FIG. 12A. The visible-light select/transmit filter is used as a filter for selectively transmitting visible light Lrgb only so that the light detecting sub-sensor 111A is made capable of detecting visible light Lrgb only. In such a configuration, the light detecting sub-sensor 111A is a typical implementation of a first light receiving sub-device according to an embodiment of the present application whereas the light detecting sub-sensor 111B is a typical implementation of a second light receiving sub-device provided by the present embodiment.

In addition, the light reception scanner 31 can also be configured to thin out the number of times the driving operation is carried out with respect to the number of times the driving operation is carried out by the visible-light emission scanner 24. For example, the light reception scanner 31 is configured to carry out a driving operation once every two or three driving operations performed by the visible-light emission scanner 24. By designing the light reception scanner 31 into such a configuration, in addition to the effect exhibited by the embodiment, the amount of data conveyed by the received-light signal can also be reduced so that it is possible to simplify light receiving circuits such as the light reception scanner 31, the received-light signal receiver 32 and the received-light signal holding section 33 as well as reduce the power consumption. Thus, the configuration is particularly effective for efforts to simplify the circuits on the light receiving side and reduce the power consumption at the expense of reduced precision of the detected position of a detection-subject object 12 which is coming into contact with or approaching the display face 10.

It is also possible to provide a configuration in which a plurality of light-receiving sub-cells CR receive light beams emitted by a plurality of red light emitting sub-cells CWr, a plurality of green light emitting sub-cells CWg and a plurality of blue light emitting sub-cells CWb, generating a plurality of received-light signals which are summed up to result in one received-light signal as an output signal. With such a configuration, in addition to the effect exhibited by the embodiment, the amount of data conveyed by the received-light signal can be reduced so that it is possible to simplify light receiving circuits such as the light reception scanner 31, the received-light signal receiver 32 and the received-light signal holding section 33 as well as reduce the power consumption. In addition, in such a configuration, a plurality of received-light signals are summed up to result in one received-light signal as an output signal which is supplied to the received-light signal receiver 32. It is thus possible to increase the S/N ratio (signal to noise ratio) by raising the magnitude of the output signal and enhance the detection sensitivity.

It is also possible to provide a configuration in which the number of locations of light-receiving sub-cells CR is thinned out with respect to red light emitting sub-cells CWr, green light emitting sub-cells CWg and blue light emitting sub-cells CWb. With such a configuration, in addition to the effect exhibited by the embodiment, the amount of data conveyed by the received-light signal can also be reduced so that it is possible to simplify light receiving circuits such as the light reception scanner 31, the received-light signal receiver 32 and the received-light signal holding section 33 as well as reduce the power consumption. Conversely, a plurality of light-receiving sub-cells CR are used for every set including a red light emitting sub-cells CWr, a green light emitting sub-cell block CWg and a blue light emitting sub-cell block CWb. With such a configuration, in addition to the effect exhibited by the embodiment, it is possible to more precisely detect the position of a detection-subject object 12 which is coming into contact with or approaching the display face 10.

The embodiment of the present application has been explained so far. However, the scope of the present application is by no means limited to the embodiment. That is to say, it is possible to provide a variety of modified versions which may be derived from the embodiment.

For example, the embodiment described above determines the position of a detection-subject object 12 on the display section 1 on the basis of a received-light signal which is a signal representing received light. However, it is possible to provide a modified version which can be used for determining at least one of the position and size of the detection-subject object 12 on the basis of a signal representing received light. It is also possible to provide a modified version which can be used for detecting a plurality of detection-subject bodies existing at the same time.

Figure 13:
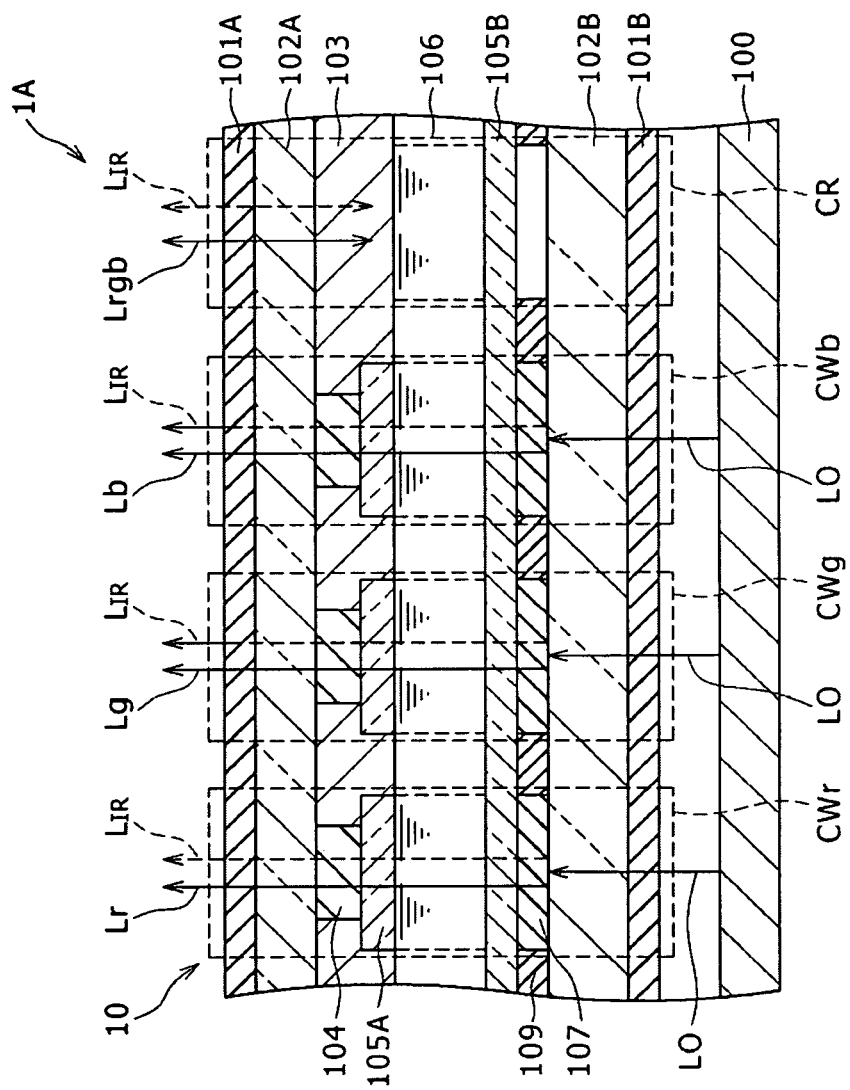
FIG. 13 is a cross-sectional diagram showing a typical cross-sectional model of a display section of still another example.

In addition, the embodiment described above implements a display section 1 in which color filters 107 are provided in areas associated with the light emitting cells (that is, the red-light emitting sub-cell CWr, the green-light emitting sub-cell CWg and the blue-light emitting sub-cell CWb) as areas on the lower face of the upper glass substrate 102B which is placed on the side close to the display face 10 as shown in the cross-sectional diagram of FIG. 3. However, it is possible to provide a configuration like a display section 1A shown in a cross-sectional diagram of FIG. 13. In this configuration, in comparison with the display section 1 shown in the cross-sectional diagram of FIG. 3, the position of the glass substrate 102B which is placed on the side close to the transparent common electrode 105B and the position of the glass substrate 102A placed on the side close to the transparent device electrodes 105A are reversed upside down with respect to the liquid-crystal layer 106. In addition, the color filters 107 can be provided in areas associated with the light emitting cells (that is, the red-light emitting sub-cell CWr, the green-light emitting sub-cell CWg and the blue-light emitting sub-cell CWb) as areas on upper the face of the glass substrate 102B which is placed on the side far away from the display face 10, that is, the side close to the light source 100. As an alternative, the color filters 107 can be provided on both the glass substrate 102A and the glass substrate 102B which form a glass-substrate pair.

On top of that, in the embodiment described above, each of the red-light emitting sub-cell CWr, the green-light emitting sub-cell CWg and the blue-light emitting sub-cell CWb emits invisible light LIR always having a constant luminance. However, the luminance does not have to be constant all the time. For example, it is also possible to provide a configuration in which the invisible light LIR is emitted with the shape of a pulse waveform having a period determined in advance. With such a configuration, in addition to the effect exhibited by the embodiment, the power consumption can be reduced.

In addition, in the embodiment described above, the light source 100 is capable of emitting backlight light LO including visible light Lrgb and invisible light LIR. As an alternative, however, it is also possible to provide a configuration which includes a first light source capable of emitting visible light Lrgb and a second light source physically separated away from the first light source as a light source capable of emitting invisible light LIR.

On top of that, in the embodiment described above, the invisible light LIR is light in a domain of wavelengths greater than those of the domain of visible light. Examples of the invisible light LIR are near infrared light and infrared light. However, it is also possible to provide a configuration which the invisible light LIR is reversely light in a domain of wavelengths smaller than those of the domain of visible light. An example of such invisible light LIR is ultraviolet light.

In addition, in the embodiment described above, the pixels 11 each included in the display section 1 as a pixel employing light emitting devices and a light receiving device are laid out to form a matrix and subjected to line-sequential operations. However, the layout and driving method of the pixels 11 each included in the display section 1 as a pixel employing light emitting devices and a light receiving device have by no means to be the layout and the driving method which are provided by the embodiment. For example, the pixels 11 each included in the display section 1 as a pixel employing light emitting devices and a light receiving device can be laid out to form a predetermined shape as the shape of a segment.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid-crystal display apparatus comprising:
a light source for generating visible-domain light and invisible-domain light;
a plurality of liquid-crystal devices laid out in a display face region of said liquid-crystal display apparatus for modulating visible-domain light generated by said light source on the basis of image data and transmitting invisible domain light generated by said light source, wherein each of the liquid-crystal devices comprises a pair of transparent substrates facing each other and color filters placed on one of the substrates that is disposed closer to the light source;
a plurality of light receiving devices laid out in said display face region as devices each used for receiving the visible-domain light and the invisible-domain light;
display driving means for driving said liquid-crystal devices on the basis of said image data so as to radiate visible-domain light from said display face as display light;
light-reception driving means for driving said light receiving devices to detect the visible-domain light and the invisible-domain light radiated from said display face and reflected by a detection-subject object reflecting said invisible-domain light generated by said light source and radiated from said display face, as detected light;
a received-light signal receiver for acquiring a received-light signal obtained from the light receiving devices for one horizontal line;
a received-light signal holding means for reconfiguring the received-light signal and storing the reconfigured received-light signal in a memory; and
a position detection means for carrying out signal processing for detecting position of said detection-subject object on the basis of the reconfigured received-light signal.

2. The liquid-crystal display apparatus according to claim 1 wherein at least one of the position and size of said detection-subject object is detected on the basis of said detected light.

3. The liquid-crystal display apparatus according to claim 1 wherein a plurality of detection-subject bodies are detected on the basis of said detected light.

4. The liquid-crystal display apparatus according to claim 1 wherein said light source comprises a first light sub-source for generating visible-domain light and a second light sub-source for generating invisible-domain light.

5. The liquid-crystal display apparatus according to claim 1 wherein each of said light receiving devices is made of single-crystal silicon, poly-crystal silicon, or amorphous silicon.

6. The liquid-crystal display apparatus according to claim 1, wherein the color filters are placed between a transparent common electrode and one of the substrates that is disposed closer to the light source.

7. The liquid-crystal display apparatus according to claim 1 wherein:
said liquid-crystal devices and said light receiving devices are laid out on said display face to form a matrix;
said display driving means drives said liquid-crystal devices to emit light in line-sequential display operations; and
said light-reception driving means drives said light receiving devices to receive light in line-sequential light receiving operations.

8. The liquid-crystal display apparatus according to claim 7 wherein said light-reception driving means drives said light receiving devices to receive light in said line-sequential light receiving operations each synchronized with one of said line-sequential display operations.

9. The liquid-crystal display apparatus according to claim 1 wherein:
each of said liquid-crystal devices comprises a pair of transparent substrates facing each other and a liquid-crystal layer sandwiched between said transparent substrates;
said display driving means includes a switching device for driving each of said liquid-crystal devices; and
said light receiving devices and said switching devices are provided on the same transparent substrate.

10. The liquid-crystal display apparatus according to claim 9 wherein each of said liquid-crystal devices includes a color filter provided on at least one of said transparent substrates forming said pair.

11. The liquid-crystal display apparatus according to claim 1 wherein:
each of said light receiving devices is also capable of receiving visible-domain light; and
said light-reception driving means drives said light receiving devices to detect visible-domain light radiated from said display face and reflected by said detection-subject object reflecting said visible-domain light generated by said light source and radiated from said display face, as said detected light.

12. The liquid-crystal display apparatus according to claim 11 wherein:
each of said light receiving devices comprises a first light receiving sub-device for receiving visible-domain light and a second light receiving sub-device for receiving invisible-domain light; and
said light-reception driving means drives said first light receiving sub-devices and said second light receiving sub-devices so that said first light receiving sub-devices detect visible-domain light reflected by said detection-subject object, whereas said second light receiving sub-devices detect invisible-domain light, reflected by said detection-subject object.

13. The liquid-crystal display apparatus according to claim 12 wherein said light-reception driving means drives said first light receiving sub-devices and said second light receiving sub-devices by switching said light receiving devices from said first light receiving sub-devices to said second light receiving sub-devices and vice versa.

14. The liquid-crystal display apparatus according to claim 1 wherein said color filters are provided in areas associated with light emitting cells.

15. The liquid-crystal display apparatus according to claim 14 wherein the light emitting cells include a red-light emitting sub-cell, a green-light emitting sub-cell, and a blue-light emitting sub-cell.

16. The liquid-crystal display apparatus according to claim 15 wherein each of the red-light emitting sub-cell, the green-light emitting sub-cell, and the blue-light emitting sub-cell emits an invisible light.

17. The liquid-crystal display apparatus according to claim 16 wherein the invisible light has a constant luminance.

18. The liquid-crystal display apparatus according to claim 16 wherein the invisible light is emitted with the shape of a pulse waveform having a predetermined period to reduce a power consumption.

19. The liquid-crystal display apparatus according to claim 16 wherein the invisible light is a light in a domain of wavelengths greater than those of the domain of visible light.

20. The liquid-crystal display apparatus according to claim 16 wherein the invisible light is a light in a domain of wavelengths smaller than those of the domain of visible light.

* * * * *